US012414107B2

(12) United States Patent
Chakraborty et al.

(10) Patent No.: US 12,414,107 B2
(45) Date of Patent: Sep. 9, 2025

(54) IMPROVING NETWORK TRANSMIT POWER PROFILE BY RANDOMIZING RESOURCE GRANTS ON A MULTI-USER COMMUNICATIONS NETWORK

(71) Applicant: VIASAT, INC., Carlsbad, CA (US)

(72) Inventors: Kaushik Chakraborty, San Diego, CA (US); Srikar Potta, San Marcos, CA (US); Aniruddha Das, San Marcos, CA (US); James E. Petranovich, San Diego, CA (US)

(73) Assignee: VIASAT, INC., Carlsbad, CA (US)

( * ) Notice: Subject to any disclaimer, the term of this patent is extended or adjusted under 35 U.S.C. 154(b) by 0 days.

(21) Appl. No.: 18/671,723

(22) Filed: May 22, 2024

(65) Prior Publication Data

US 2024/0397507 A1    Nov. 28, 2024

Related U.S. Application Data

(62) Division of application No. 17/917,213, filed as application No. PCT/US2021/026051 on Apr. 6, 2021, now Pat. No. 12,022,460.
(Continued)

(51) Int. Cl.
*H04W 72/1263* (2023.01)
*H04W 72/543* (2023.01)

(52) U.S. Cl.
CPC ..... *H04W 72/1263* (2013.01); *H04W 72/543* (2023.01)

(58) Field of Classification Search
CPC ............. H04W 72/04; H04W 72/1263; H04W 72/044; H04L 5/0035; H04L 5/0096;
(Continued)

(56) References Cited

U.S. PATENT DOCUMENTS 10,153,831 B1    12/2018    Gokhale et al.
2003/0032427 A1    2/2003    Walsh et al.
(Continued)

FOREIGN PATENT DOCUMENTS

CN    106714312 A    5/2017
EP    1 091 506 A2    4/2001
(Continued)

OTHER PUBLICATIONS

International Search Report and Written Opinion for Int'l App. No. PCT/US2021/026051, dated Jul. 28, 2021, in 15 pages.
(Continued)

*Primary Examiner* — Romani Ohri
(74) *Attorney, Agent, or Firm* — Chang & Hale LLP

(57) ABSTRACT

Schedulers that allocate resource grants on a slot-by-slot basis within a scheduling epoch or frame can create a front-loading effect where allocations occur more frequently in slots earlier in frames. To address these and other issues, systems and methods are disclosed for scheduling resource grants in a network to improve network transmit power profiles. For example, a scheduler is configured to randomize the order of slots in a scheduling epoch or frame, with different randomizations for different schedulers, to more evenly distribute slots with resource grant allocations to prevent or reduce a front-loading effect. As another example, the scheduler is configured to randomize start times of resource blocks within a slot to prevent or reduce the front-loading effect.

26 Claims, 18 Drawing Sheets

Related U.S. Application Data

(60) Provisional application No. 63/005,995, filed on Apr. 6, 2020.

(58) Field of Classification Search
CPC ............... H04L 5/0037; H04L 5/0058; H04L 12/40065; H04L 2012/5632; H04L 47/70
See application file for complete search history.

(56) References Cited

U.S. PATENT DOCUMENTS

| | | |
|---|---|---|
| 2007/0153727 A1 | 7/2007 | McBeath et al. |
| 2014/0177521 A1 | 6/2014 | Agarwal |
| 2016/0095137 A1 | 3/2016 | Chen et al. |
| 2017/0208616 A1 | 7/2017 | Panteleev et al. |
| 2019/0254061 A1* | 8/2019 | Manolakos ............ H04L 5/0051 |
| 2020/0195407 A1* | 6/2020 | Du ........................ H04W 72/23 |
| 2020/0305068 A1 | 9/2020 | Ratnam et al. |
| 2021/0176740 A1* | 6/2021 | Lee ....................... H04W 72/02 |
| 2022/0053567 A1* | 2/2022 | Lei ........................ H04L 5/0048 |

FOREIGN PATENT DOCUMENTS

| | | |
|---|---|---|
| WO | 2017019121 A1 | 2/2017 |
| WO | 2018092132 A1 | 5/2018 |
| WO | 2019022468 A1 | 1/2019 |

OTHER PUBLICATIONS

International Preliminary Report on Patentability for Int'l App. No. PCT/US2021/026051, dated Mar. 2, 2022, in 6 pages.

Couble et al., "Two-Color Scheme for a Multi-Beam Satellite Return Link: Impact of Interference Coordination," IEE Journal on Selected Areas in Communications, vol. 36, No. 5, May 2018, pp. 993-1003.

Petraki et al., "Dynamic resource allocation for DVB-RCS networks," Int. J. Commun. Syst. Network 2008; 26:189-210.

Morell et al., "Joint Time Slot Optimization and Fair Bandwidth Allocation for DVB-RCS Systems," IEEE Globecom 2006 proceedings, in 5 pages.

* cited by examiner

IMPROVING NETWORK TRANSMIT POWER PROFILE BY RANDOMIZING RESOURCE GRANTS ON A MULTI-USER COMMUNICATIONS NETWORK

CROSS-REFERENCE TO RELATED APPLICATIONS

This application is a division of U.S. patent application Ser. No. 17/917,213 filed Oct. 5, 2022 and entitled "IMPROVING NETWORK TRANSMIT POWER PROFILE BY RANDOMIZING RESOURCE GRANTS ON A MULTI-USER COMMUNICATIONS NETWORK," which is a national stage entry of PCT App. No. PCT/US2021/026051 filed Apr. 6, 2021 and entitled "IMPROVING NETWORK TRANSMIT POWER PROFILE BY RANDOMIZING RESOURCE GRANTS ON A MULTI-USER COMMUNICATIONS NETWORK," which claims priority to U.S. Prov. App. No. 63/005,995 filed Apr. 6, 2020 and entitled "SATELLITE COMMUNICATION SYSTEM RETURN LINK SCHEDULER RANDOMIZATION," each of which is expressly incorporated by reference herein in its entirety for all purposes.

BACKGROUND

Field

The present disclosure generally relates to allocating resource grants to user terminals in a communications system.

Description of Related Art

Network communications involve sending data back and forth between nodes, such as a content server and a user terminal. To send data over a network, a scheduler can be used to allocate network resources to devices, creating a schedule of transmission for devices. Then, based on the schedule, the individual devices can transmit data using the allocated resources. Network communications may use time division multiple access (TDMA) which is a frequency-hopped, time-sequenced transmission scheme or multi-frequency TDMA (MF-TDMA) which allows a large community of users to share bandwidth.

SUMMARY

The disclosure relates to a method for allocating resource grants for a plurality of beams on a satellite communications network. The method includes generating a randomizing map for each of the plurality of beams to randomize an order for allocating resource grants to slots in frames, individual frames comprising a plurality of slots for allocating resource grants to one or more user terminals. The method includes for each beam of the plurality of beams: determining a plurality of active slots for a current frame of the beam, the plurality of active slots comprising a subset of the plurality of slots in the current frame to be used to allocate resource grants; generating an allocation order for the plurality of active slots according to the randomizing map of the beam, the allocation order different from a time order of the plurality of active slots in the current frame of the beam; and proceeding through the plurality of active slots in the allocation order to allocate resource grants within individual active slots.

In some embodiments, generating the randomizing map comprises generating a random slot offset. In further embodiments, the allocation order begins with an active slot that corresponds to the random slot offset and proceeds through the plurality of active slots in the time order of the plurality of active slots after the active slot corresponding to the random slot offset. In further embodiments, proceeding through the plurality of active slots further comprises returning to a first active slot in the time order of the plurality of active slots in the current frame and advancing in the time order through the plurality of active slots until reaching the slot prior to the active slot that corresponds to the random slot offset.

In some embodiments, each of the plurality of active slots in the frame includes an index corresponding to an order in time of the plurality of active slots and the randomizing map comprises a random order of the indices of the plurality of active slots. In further embodiments, the allocation order comprises the random order of the indices of the plurality of active slots.

In some embodiments, resource grants are allocated based at least in part on bandwidth demands in the satellite communications network. In some embodiments, resource grants are allocated based at least in part on quality of service requirements in the satellite communications network.

In some embodiments, individual slots in a frame comprise one or more resource block allocations to one or more user terminals, individual resource block allocations including an allocation of time and frequency within an individual slot. In further embodiments, allocation of resource grants is constrained such that a single user terminal is not scheduled to transmit on multiple frequency channels simultaneously. In further embodiments, allocation of resource grants is constrained such that multiple user terminals within a beam are not scheduled to simultaneously transmit on identical frequency channels.

In some embodiments, allocating resource grants comprises allocating return-link bandwidth. In some embodiments, the randomizing map for a beam remains unchanged over a plurality of frames. In some embodiments, each randomizing map is randomly generated to improve network load distribution based at least in part on statistical randomization. In some embodiments, each randomizing map is assigned to a particular beam to improve overall network load across slots on average.

The disclosure relates to a network resource manager in a communications network. The network resource manages includes a network interface configured to communicate with one or more schedulers of the communications network. The network resource manages includes a data store configured to store computer executable instructions for allocating resource grants for a plurality of pipes on the communications network, individual pipes comprising one or more service flows. The network resource manages includes a processor configured to execute the computer executable instructions to perform the following: generate a randomizing map for each of the plurality of pipes to randomize an order for allocating resource grants to slots in frames, individual frames comprising a plurality of slots for allocating resource grants to one or more user terminals; and for each pipe of the plurality of pipes: determine a plurality of active slots for a current frame of the pipe, the plurality of active slots comprising a subset of the plurality of slots in the current frame to be used to allocate resource grants; generate an allocation order for the plurality of active slots according to the randomizing map of the pipe, the allocation order different from a time order of the plurality of active slots in the current frame of the pipe; and proceed through the plurality of active slots in the allocation order to allocate resource grants within individual active slots.

In some embodiments, generating the randomizing map comprises generating a random slot offset. In further embodiments, the allocation order begins with an active slot that corresponds to the random slot offset and proceeds through the plurality of active slots in the time order of the plurality of active slots after the active slot corresponding to the random slot offset. In further embodiments, proceeding through the plurality of active slots further comprises returning to a first active slot in the time order of the plurality of active slots in the current frame and advancing in the time order through the plurality of active slots until reaching the slot prior to the active slot that corresponds to the random slot offset.

In some embodiments, each of the plurality of active slots in the frame includes an index corresponding to an order in time of the plurality of active slots and the randomizing map comprises a random order of the indices of the plurality of active slots. In further embodiments, the allocation order comprises the random order of the indices of the plurality of active slots.

In some embodiments, resource grants are allocated based at least in part on bandwidth demands in the communications network. In some embodiments, resource grants are allocated based at least in part on quality of service requirements in the communications network.

In some embodiments, individual slots in a frame comprise one or more resource block allocations to one or more user terminals, individual resource block allocations including an allocation of time and frequency within an individual slot. In further embodiments, allocation of resource grants is constrained such that a single user terminal is not scheduled to transmit on multiple frequency channels simultaneously. In further embodiments, allocation of resource grants is constrained such that multiple user terminals within a pipe are not scheduled to simultaneously transmit on identical frequency channels.

In some embodiments, allocating resource grants comprises allocating return-link bandwidth. In some embodiments, the randomizing map for a pipe remains unchanged over a plurality of frames. In some embodiments, each randomizing map is randomly generated to improve network load distribution based at least in part on statistical randomization. In some embodiments, each randomizing map is assigned to a particular pipe to improve overall network load across slots on average.

The disclosure relates to a method for allocating resource grants on a communications network, resource grants allocated using frames having a plurality of slots that are ordered based on a position in time of a slot in a corresponding frame. The method includes generating a randomizing map to randomize an order for allocating resource grants to slots in a frame. The method includes determining a plurality of active slots for a current frame, the plurality of active slots comprising a subset of the plurality of slots in the current frame to be used to allocate resource grants. The method includes generating an allocation order for the plurality of active slots according to the randomizing map, the allocation order different from a time order of the plurality of active slots in the current frame. The method includes proceeding through the plurality of active slots in the allocation order to allocate resource grants within individual active slots.

In some embodiments, generating the randomizing map comprises generating a random slot offset. In further embodiments, the allocation order begins with an active slot that corresponds to the random slot offset and proceeds through the plurality of active slots in the time order of the plurality of active slots after the active slot corresponding to the random slot offset. In further embodiments, proceeding through the plurality of active slots further comprises returning to a first active slot in the time order of the plurality of active slots in the current frame and advancing in the time order through the plurality of active slots until reaching the slot prior to the active slot that corresponds to the random slot offset.

In some embodiments, each of the plurality of active slots in the frame includes an index corresponding to an order in time of the plurality of active slots and the randomizing map comprises a random order of the indices of the plurality of active slots. In further embodiments, the allocation order comprises the random order of the indices of the plurality of active slots.

In some embodiments, resource grants are allocated based at least in part on bandwidth demands in the communications network. In some embodiments, resource grants are allocated based at least in part on quality of service requirements in the communications network.

In some embodiments, individual slots in a frame comprise one or more resource block allocations to one or more user terminals, individual resource block allocations including an allocation of time and frequency within an individual slot. In further embodiments, allocation of resource grants is constrained such that a single user terminal is not scheduled to transmit on multiple frequency channels simultaneously.

In some embodiments, allocating resource grants comprises allocating return-link bandwidth. In some embodiments, the randomizing map remains unchanged over a plurality of frames.

The disclosure relates to a scheduler in a communications network. The scheduler includes a network interface configured to communicate with a plurality of user terminals over the communications network. The scheduler includes a data store configured to store computer executable instructions for allocating resource grants, resource grants allocated using frames having a plurality of slots that are ordered based on a position in time of a slot in a corresponding frame. The scheduler includes a processor configured to execute the computer executable instructions to perform the following: generate a randomizing map to randomize an order for allocating resource grants to slots in a frame; determine a plurality of active slots for a current frame, the plurality of active slots comprising a subset of the plurality of slots in the current frame to be used to allocate resource grants; generate an allocation order for the plurality of active slots according to the randomizing map, the allocation order different from a time order of the plurality of active slots in the current frame; and proceed through the plurality of active slots in the allocation order to allocate resource grants within individual active slots.

In some embodiments, generating the randomizing map comprises generating a random slot offset. In further embodiments, the allocation order begins with an active slot that corresponds to the random slot offset and proceeds through the plurality of active slots in the time order of the plurality of active slots after the active slot corresponding to the random slot offset. In further embodiments, proceeding through the plurality of active slots further comprises returning to a first active slot in the time order of the plurality of active slots in the current frame and advancing in the time order through the plurality of active slots until reaching the slot prior to the active slot that corresponds to the random slot offset.

In some embodiments, each of the plurality of active slots in the frame includes an index corresponding to an order in time of the plurality of active slots and the randomizing map comprises a random order of the indices of the plurality of active slots. In further embodiments, the allocation order comprises the random order of the indices of the plurality of active slots.

In some embodiments, resource grants are allocated based at least in part on bandwidth demands in the communications network. In some embodiments, resource grants are allocated based at least in part on quality of service requirements in the communications network.

In some embodiments, individual slots in a frame comprise one or more resource block allocations to one or more user terminals, individual resource block allocations including an allocation of time and frequency within an individual slot. In further embodiments, allocation of resource grants is constrained such that a single user terminal is not scheduled to transmit on multiple frequency channels simultaneously.

In some embodiments, allocating resource grants comprises allocating return-link bandwidth. In some embodiments, the randomizing map remains unchanged over a plurality of frames.

The disclosure relates to a method for allocating resource grants on a communications network, resource grants allocated using frames having a plurality of slots. The method includes determining a plurality of active slots for a current frame, the plurality of active slots comprising a subset of the plurality of slots in the current frame to be used to allocate resource grants. The method includes proceeding through the plurality of active slots to allocate resource grants within individual active slots to one or more user terminals. The method includes distributing allocated resource grants in time by adjusting a time position within the slot of each resource grant to the one or more user terminals.

n some embodiments, individual slots comprise bandwidth allocations to one or more user terminals, individual bandwidth allocations including an allocation of time and frequency within the corresponding slot. In further embodiments, allocating resource grants is constrained such that a single user terminal is not scheduled to transmit on multiple frequency channels simultaneously. In further embodiments, allocating resource grants is constrained such that multiple user terminals are not scheduled to simultaneously transmit on identical frequency channels.

In some embodiments, resource grants are grouped into a plurality of return channel groups, individual return channel groups comprising a set of frequency channels allocated to a collection of user terminals. In further embodiments, distributing allocated resource grants in time comprises inverting a time order of resource grants in a return channel group for randomly selected slots. In further embodiments, inverting the time order comprises recalculating a start time of each resource grant in the return channel group while maintaining a duration of each resource grant. In further embodiments, the randomly selected slots comprise the slots in approximately half of the plurality of return channel groups.

In some embodiments, distributing allocated resource grants in time comprises shifting a start time of each resource grant within a slot by a random time offset. In further embodiments, a resource grant that extends beyond an end of the slot due to the shift in the start time is divided so that a portion of the resource grant is provided at a beginning of the slot. In further embodiments, a resource grant that is divided results in a reduced resource allocation relative to the corresponding resource grant prior to shifting the start time. In further embodiments, the method further includes truncating a duration of a resource grant that extends beyond an end of the slot due to the shifted start time so that the resource grant does not extend beyond the end of the slot. In further embodiments, the random time offset is limited such that none of the resource grants in the slot extend beyond an end of the slot.

The disclosure relates to a scheduler in a communications network. The scheduler includes a network interface configured to communicate with a plurality of user terminals over the communications network. The scheduler includes a data store configured to store computer executable instructions for allocating resource grants, resource grants allocated using frames having a plurality of slots that are ordered based on a position in time of a slot in a corresponding frame. The scheduler includes a processor configured to execute the computer executable instructions to perform the following: determining a plurality of active slots for a current frame, the plurality of active slots comprising a subset of the plurality of slots in the current frame to be used to allocate resource grants; proceeding through the plurality of active slots to allocate resource grants within individual active slots to one or more user terminals; and distributing allocated resource grants in time by adjusting a time position within the slot of each resource grant to the one or more user terminals.

In some embodiments, individual slots comprise bandwidth allocations to one or more user terminals, individual bandwidth allocations including an allocation of time and frequency within the corresponding slot. In further embodiments, allocating resource grants is constrained such that a single user terminal is not scheduled to transmit on multiple frequency channels simultaneously. In some embodiments, allocating resource grants is constrained such that multiple user terminals are not scheduled to simultaneously transmit on identical frequency channels.

In some embodiments, wherein resource grants are grouped into a plurality of return channel groups, individual return channel groups comprising a set of frequency channels allocated to a collection of user terminals. In further embodiments, distributing allocated resource grants in time comprises inverting a time order of resource grants in a return channel group for randomly selected slots. In further embodiments, inverting the time order comprises recalculating a start time of each resource grant in the return channel group while maintaining a duration of each resource grant. In further embodiments, the randomly selected slots comprise the slots in approximately half of the plurality of return channel groups.

In some embodiments, distributing allocated resource grants in time comprises shifting a start time of each resource grant within a slot by a random time offset. In further embodiments, a resource grant that extends beyond an end of the slot due to the shift in the start time is divided so that a portion of the resource grant is provided at a beginning of the slot. In further embodiments, a resource grant that is divided results in a reduced resource allocation relative to the corresponding resource grant prior to shifting the start time. In further embodiments, the processor is further configured to truncate a duration of a resource grant that extends beyond an end of the slot due to the shifted start time so that the resource grant does not extend beyond the end of the slot. In further embodiments, the random time offset is limited such that none of the resource grants in the slot extend beyond an end of the slot.

The disclosure relates to a method for allocating resource grants for a plurality of beams on a satellite communications network. The method includes generating a randomizing map for each of the plurality of beams to randomize an order for allocating resource grants to slots in frames, individual frames comprising a plurality of slots for allocating resource grants to one or more user terminals. The method includes for each beam of the plurality of beams: determining a plurality of active slots for a current frame of the beam, the plurality of active slots comprising a subset of the plurality of slots in the current frame to be used to allocate resource grants; generating an allocation order for the plurality of active slots according to the randomizing map of the beam, the allocation order different from a time order of the plurality of active slots in the current frame of the beam; proceeding through the plurality of active slots in the allocation order to allocate resource grants within individual active slots to one or more user terminals; and distributing allocated resource grants in time by adjusting a time position within the slot of each resource grant to the one or more user terminals.

In some embodiments, generating the randomizing map comprises generating a random slot offset. In further embodiments, the allocation order begins with an active slot that corresponds to the random slot offset and proceeds through the plurality of active slots in the time order of the plurality of active slots after the active slot corresponding to the random slot offset. In further embodiments, proceeding through the plurality of active slots further comprises returning to a first active slot in the time order of the plurality of active slots in the current frame and advancing in the time order through the plurality of active slots until reaching the slot prior to the active slot that corresponds to the random slot offset.

In some embodiments, each of the plurality of active slots in the frame includes an index corresponding to an order in time of the plurality of active slots and the randomizing map comprises a random order of the indices of the plurality of active slots. In further embodiments, the allocation order comprises the random order of the indices of the plurality of active slots.

In some embodiments, resource grants are allocated based at least in part on bandwidth demands in the satellite communications network. In some embodiments, resource grants are allocated based at least in part on quality of service requirements in the satellite communications network.

In some embodiments, individual slots in a frame comprise one or more resource block allocations to one or more user terminals, individual resource block allocations including an allocation of time and frequency within an individual slot. In further embodiments, allocation of resource grants is constrained such that a single user terminal is not scheduled to transmit on multiple frequency channels simultaneously. In further embodiments, allocation of resource grants is constrained such that multiple user terminals within a beam are not scheduled to simultaneously transmit on identical frequency channels.

In some embodiments, allocating resource grants comprises allocating return-link bandwidth. In some embodiments, the randomizing map for a beam remains unchanged over a plurality of frames. In some embodiments, each randomizing map is randomly generated to improve network load distribution based at least in part on statistical randomization. In some embodiments, each randomizing map is assigned to a particular beam to improve overall network load across slots on average.

In some embodiments, resource grants are grouped into a plurality of return channel groups, individual return channel groups comprising a set of frequency channels allocated to a collection of user terminals. In further embodiments, distributing allocated resource grants in time comprises inverting a time order of resource grants in a return channel group for randomly selected slots. In further embodiments, inverting the time order comprises recalculating a start time of each resource grant in the return channel group while maintaining a duration of each resource grant. In further embodiments, the randomly selected slots comprise the slots in approximately half of the plurality of return channel groups.

In some embodiments, distributing allocated resource grants in time comprises shifting a start time of each resource grant within a slot by a random time offset. In further embodiments, a resource grant that extends beyond an end of the slot due to the shift in the start time is divided so that a portion of the resource grant is provided at a beginning of the slot. In further embodiments, a resource grant that is divided results in a reduced resource allocation relative to the corresponding resource grant prior to shifting the start time. In further embodiments, the method further includes truncating a duration of a resource grant that extends beyond an end of the slot due to the shifted start time so that the resource grant does not extend beyond the end of the slot. In further embodiments, the random time offset is limited such that none of the resource grants in the slot extend beyond an end of the slot.

The disclosure relates to a network resource manager in a communications network. The network resource manager includes a network interface configured to communicate with one or more schedulers of the communications network. The network resource manager includes a data store configured to store computer executable instructions for allocating resource grants for a plurality of pipes on the communications network, individual pipes comprising one or more service flows. The network resource manager includes a processor configured to execute the computer executable instructions to perform the following: generate a randomizing map for each of the plurality of beams to randomize an order for allocating resource grants to slots in frames, individual frames comprising a plurality of slots for allocating resource grants to one or more user terminals; and for each beam of the plurality of beams: determine a plurality of active slots for a current frame of the beam, the plurality of active slots comprising a subset of the plurality of slots in the current frame to be used to allocate resource grants; generate an allocation order for the plurality of active slots according to the randomizing map of the beam, the allocation order different from a time order of the plurality of active slots in the current frame of the beam; proceed through the plurality of active slots in the allocation order to allocate resource grants within individual active slots to one or more user terminals; and distribute allocated resource grants in time by adjusting a time position within the slot of each resource grant to the one or more user terminals.

In some embodiments, generating the randomizing map comprises generating a random slot offset. In further embodiments, the allocation order begins with an active slot that corresponds to the random slot offset and proceeds through the plurality of active slots in the time order of the plurality of active slots after the active slot corresponding to the random slot offset. In further embodiments, proceeding through the plurality of active slots further comprises returning to a first active slot in the time order of the plurality of active slots in the current frame and advancing in the time order through the plurality of active slots until reaching the slot prior to the active slot that corresponds to the random slot offset.

In some embodiments, each of the plurality of active slots in the frame includes an index corresponding to an order in time of the plurality of active slots and the randomizing map comprises a random order of the indices of the plurality of active slots. In further embodiments, the allocation order comprises the random order of the indices of the plurality of active slots.

In some embodiments, resource grants are allocated based at least in part on bandwidth demands in the communications network. In some embodiments, resource grants are allocated based at least in part on quality of service requirements in the communications network.

In some embodiments, individual slots in a frame comprise one or more resource block allocations to one or more user terminals, individual resource block allocations including an allocation of time and frequency within an individual slot. In further embodiments, allocation of resource grants is constrained such that a single user terminal is not scheduled to transmit on multiple frequency channels simultaneously. In further embodiments, allocation of resource grants is constrained such that multiple user terminals within a pipe are not scheduled to simultaneously transmit on identical frequency channels.

In some embodiments, allocating resource grants comprises allocating return-link bandwidth. In some embodiments, the randomizing map for a pipe remains unchanged over a plurality of frames. In some embodiments, each randomizing map is randomly generated to improve network load distribution based at least in part on statistical randomization. In some embodiments, each randomizing map is assigned to a particular pipe to improve overall network load across slots on average.

In some embodiments, resource grants are grouped into a plurality of return channel groups, individual return channel groups comprising a set of frequency channels allocated to a collection of user terminals. In further embodiments, distributing allocated resource grants in time comprises inverting a time order of resource grants in a return channel group for randomly selected slots. In further embodiments, inverting the time order comprises recalculating a start time of each resource grant in the return channel group while maintaining a duration of each resource grant. In further embodiments, the randomly selected slots comprise the slots in approximately half of the plurality of return channel groups.

In some embodiments, distributing allocated resource grants in time comprises shifting a start time of each resource grant within a slot by a random time offset. In further embodiments, a resource grant that extends beyond an end of the slot due to the shift in the start time is divided so that a portion of the resource grant is provided at a beginning of the slot. In further embodiments, a resource grant that is divided results in a reduced resource allocation relative to the corresponding resource grant prior to shifting the start time. In further embodiments, the processor is further configured to truncate a duration of a resource grant that extends beyond an end of the slot due to the shifted start time so that the resource grant does not extend beyond the end of the slot. In further embodiments, the random time offset is limited such that none of the resource grants in the slot extend beyond an end of the slot.

For purposes of summarizing the disclosure, certain aspects, advantages and novel features have been described herein. It is to be understood that not necessarily all such advantages may be achieved in accordance with any particular embodiment. Thus, the disclosed embodiments may be carried out in a manner that achieves or optimizes one advantage or group of advantages as taught herein without necessarily achieving other advantages as may be taught or suggested herein.

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

FIGS. 8A, 8B, 80, 8D, and 8E illustrate examples of shifting resource grants within an active slot to improve a transmission power profile in a communications network.

DETAILED DESCRIPTION OF SOME EMBODIMENTS

The headings provided herein, if any, are for convenience only and do not necessarily affect the scope or meaning of the claimed subject matter.

Overview

Figure 1:
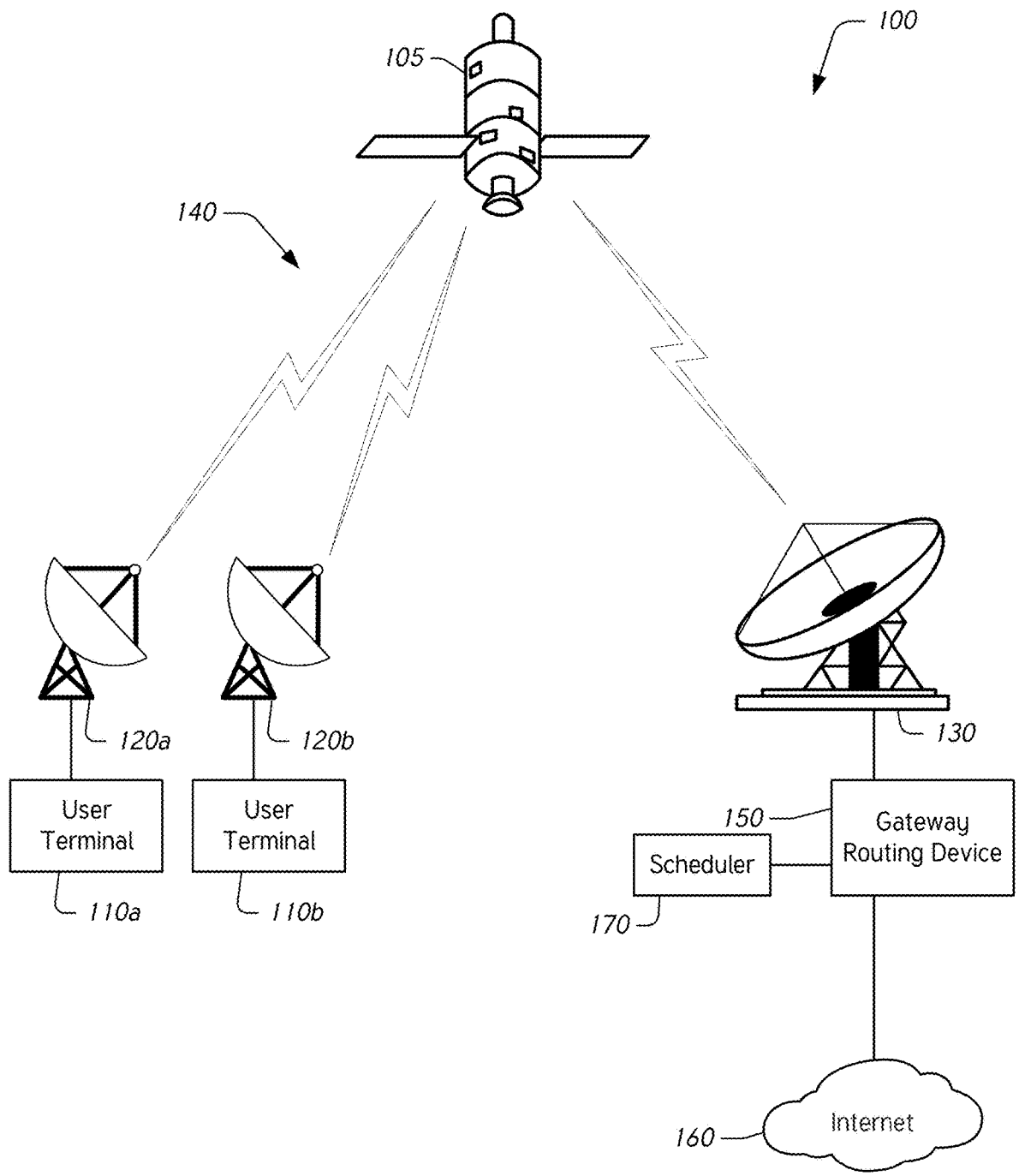
FIG. 1 illustrates a diagram of an example satellite communications network.

FIG. 1 illustrates a diagram of an example satellite communications network 100. The satellite communications network 100 includes a satellite network 140 that communicatively couples user terminals 110a, 110b and a gateway routing device 150 to one another and to a network (such as the Internet 160). The satellite communications network 100 includes a scheduler 170 configured to distribute network load by randomizing timing positions of resource allocations to the user terminals 110a, 110b. As described herein, randomizing can include randomizing an order of slots in a frame and/or randomizing resource blocks within a slot of a frame. By randomizing in this way over a plurality of user terminals and/or a plurality of schedulers, transmission power profiles can be improved by more evenly distributing resource grant allocations. In the satellite communications network 100, this may be advantageous because it improves or optimizes the use of transmission power on the return link (e.g., communication from the user terminals 110a, 110b to the gateway routing device 150).

The satellite communications network 100 may utilize various network architectures that include space and ground segments. For example, the space segment may include one or more satellites, while the ground segment may include one or more satellite user terminals, gateway terminals, network operations centers (NOCs), satellite and gateway terminal command centers, and/or the like. Some of these elements are not shown in the figure for clarity. The satellite network 140 can include a geosynchronous earth orbit (GEO) satellite or satellites, a medium earth orbit (MEO) satellite or satellites, and/or a low earth orbit (LEO) satellite or satellites.

The user terminals 110a, 110b can include a router and can be configured to receive data to be routed over the satellite communications network 100, including any type of consumer premises equipment (e.g., a telephone, modem, router, computer, set-top box, and the like).

The user terminals 110a, 110b are configured to route data to the satellite network 140 (via respective customer satellite transceivers 120a, 120b). The satellite network 140 includes a forward link for sending information from the gateway routing device 150 to the user terminals 110a, 110b, and a return link for sending information from the user terminals 110a, 110b to the gateway routing device 150. The forward link includes a transmission path from the gateway routing device 150 through a gateway satellite transceiver 130, through a satellite 105 via a satellite uplink channel, to the customer satellite transceivers 120a, 120b via a satellite downlink channel, and to the user terminals 110a, 110b. The return link includes a transmission path from the customer satellite transceivers 120a, 120b, to the satellite 105 via the satellite uplink channel, to the gateway satellite transceiver 130 via the satellite downlink channel, and to the gateway routing device 150. Each transmission channel may utilize multiple satellites and transceivers.

Each of the user terminals 110a, 110b is configured to request return-link grants on the satellite network 140 from the scheduler 170 via the gateway routing device 150. The scheduler 170 determines a return-link allocation schedule and transmits it to each user terminal 110a, 110b via the gateway routing device 150.

It would be advantageous to improve or optimize the use of transmission power on the return link, in particular on a high-throughput broadband satellite system such as the satellite communications network 100. In such a satellite communications network 100, the return link transponder gain may be variable and may be difficult to control tightly. In addition, return link downlink power is a primary contributor to return link capacity. The return link power profile is an aggregate representation of multiple uncoordinated and independent transmissions by user terminals (UTs). Resource grant allocations on the return link are typically determined by the scheduler ahead of time based on aggregate demands of multiple user terminals. However, user terminals may not fully utilize allocated grants depending on instantaneous buffer status, creating variations in the overall return link power profile. In MF-TDMA systems, for example, return link packets have the potential to interfere with other packets transmitted at the same time-frequency resource regardless of the distance separating their transmitters. Thus, it would be beneficial to improve scheduling to improve network resource utilization and improve power usage.

Schedulers that allocate resource grants on a slot-by-slot basis can create a front-loading effect where allocations occur more frequently in slots earlier in frames. In particular, earlier slots in a scheduler epoch typically have more grants and within a slot, there are typically more grants towards the beginning of slot. This may result in various schedulers (e.g., schedulers located in different sub-networks within same geographical region) being highly correlated in time. These effects may be more pronounced during uncongested periods. This may lead to signal interference, degradation in network performance, undesirable increases in power consumption, and/or undesirable power skew across a scheduling frame. For example, slots towards the beginning of a scheduling epoch will have higher return-link power due to the presence of a greater number of return-link bursts or transmissions, and slots towards the end of the scheduling epoch will have lower return-link power. This results in a higher skew (e.g., measured in terms of peak-to-average power or max-to-min power delta) across time, and this results in sub-optimal performance of the return link.

Accordingly, to address these and other issues, disclosed herein are systems and methods for scheduling resource grants in a network to statistically distribute network load. For example, as discussed in greater detail herein, the scheduler 170 is configured to randomize the order of slots in an epoch, with different randomizations for different schedulers, to distribute slots more evenly with resource grant allocations to prevent or reduce the front-loading effect. As another example, as discussed in greater detail herein, the scheduler 170 is configured to randomize start times of resource blocks within a slot to prevent or reduce the front-loading effect.

The disclosed systems and methods function in any suitable network communications system. For example, the network communications system can be provided by satellites, by terrestrial-based equipment, or a combination of satellites and terrestrial networks. Thus, the concepts disclosed herein regarding randomizing resource grant allocations can be tied to collections of service flows (or pipes) provided by any variety of network communications systems and do not require beams provided by satellite communications systems.

In some embodiments, the scheduler 170 can utilize a demand assigned multiple access (DAMA) scheduling model, an enhanced mobile satellite services (EMSS) scheduling model, and/or other scheduling techniques. Responsive to receiving a request for bandwidth allocation from the user terminals 110a, 110b, the scheduler 170 analyzes the request, network status, network congestion, prior requests, similar requests, and the like to determine a schedule for return-link bandwidth. In some embodiments, the scheduler 170 is configured to generate the schedule based on a prediction or estimation of the actual bandwidth needed to accomplish the request. Data may be transmitted from a particular user terminal 110a, 110b through the satellite 105 to the gateway routing device 150 using bandwidth requested by the user terminal 110a, 110b and allocated by the scheduler 170.

Based on the allocated resource grants from the scheduler 170, the user terminals 110a, 110b transmit data to the gateway routing device 150 through the satellite network 140 via the return link. After reaching the gateway routing device 150, the data can then be directed to the Internet 160. Data from the Internet 160 can be sent to the user terminals 110a, 110b by the gateway routing device 150 via the forward link of the satellite network 140. In some embodiments, part or all of the gateway routing device 150 and/or the scheduler 170 can be located in a virtual device residing in a public or private computing cloud.

Figure 2:
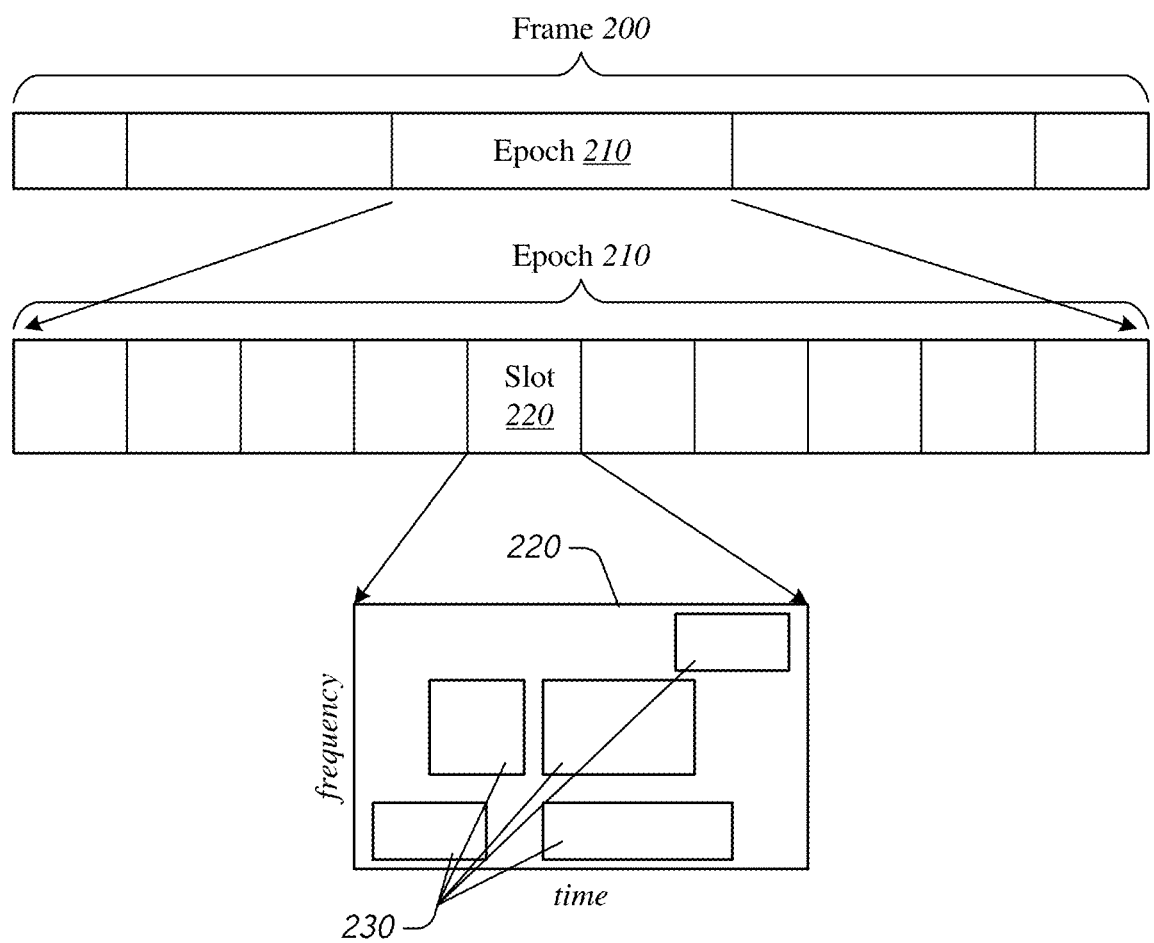
FIG. 2 illustrates a block diagram representing scheduling frames, scheduling epochs, and slots for allocating resource grants to user terminals in a communications network.

FIG. 2 illustrates an example of a scheduling frame 200, scheduling epoch 210, and slot 220 for allocating resource grants to user terminals. Network resources can be allocated using frames 200 that divide time into discrete chunks referred to as slots 220. In some embodiments, slots 220 can be grouped into epochs 210 and/or frames can be divided into epochs 210 and epochs can be divided into slots 220. Slots 220 represent a discrete chunk of time and frequency for allocating resources to user terminals. Within a slot 220, resource blocks 230 can be allocated to individual user terminals. Each resource block 230 can represent an allocation of frequency (illustrated along the y-axis of the slot 220), e.g., an allocation on a particular frequency channel, and an allocation of time (illustrated along the x-axis of the slot 220). A scheduler (e.g., the scheduler 170) can allocate resource blocks 230 in active slots 220 by advancing through each active slot 220 in an epoch 210, advancing to the next epoch 210, allocating resource blocks 230 in the active slots of that epoch 210, and so forth. As disclosed herein, the order the scheduler proceeds through the active slots 220 in an epoch 210 and/or a frame 200 can be randomized to statistically distribute network load over the epoch 210 and/or frame 200. As disclosed herein, after allocating resource blocks 230 in an active slot 220, the scheduler can adjust the start times of resource blocks 230 to statistically distribute network load.

In some embodiments, a scheduling frame 200 can be divided into a number, $N_{frame}$, of slots 210. A scheduler can then group a number, $N_{epoch}$, of slots into an epoch, where $N_{frame} > N_{epoch}$. Each slot 220 includes 0 or more resource block allocations to 0 or more user terminals, meaning that some slots may be unused and/or unassigned.

Figure 3A:
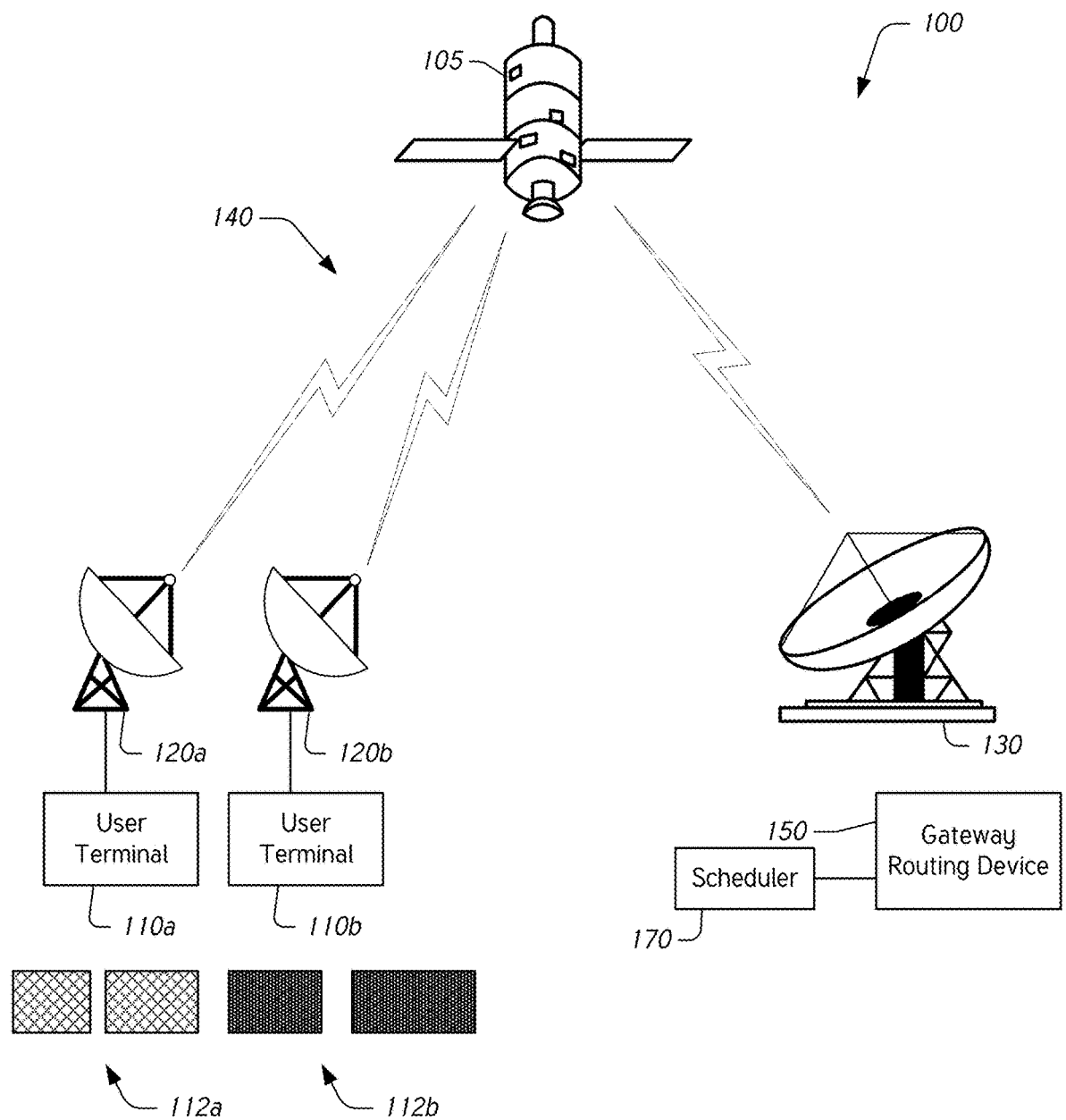
FIGS. 3A, 3B, and 3C illustrate an example procedure for requesting and receiving resource grants in the satellite communications network of FIG. 1.
Figure 3B:
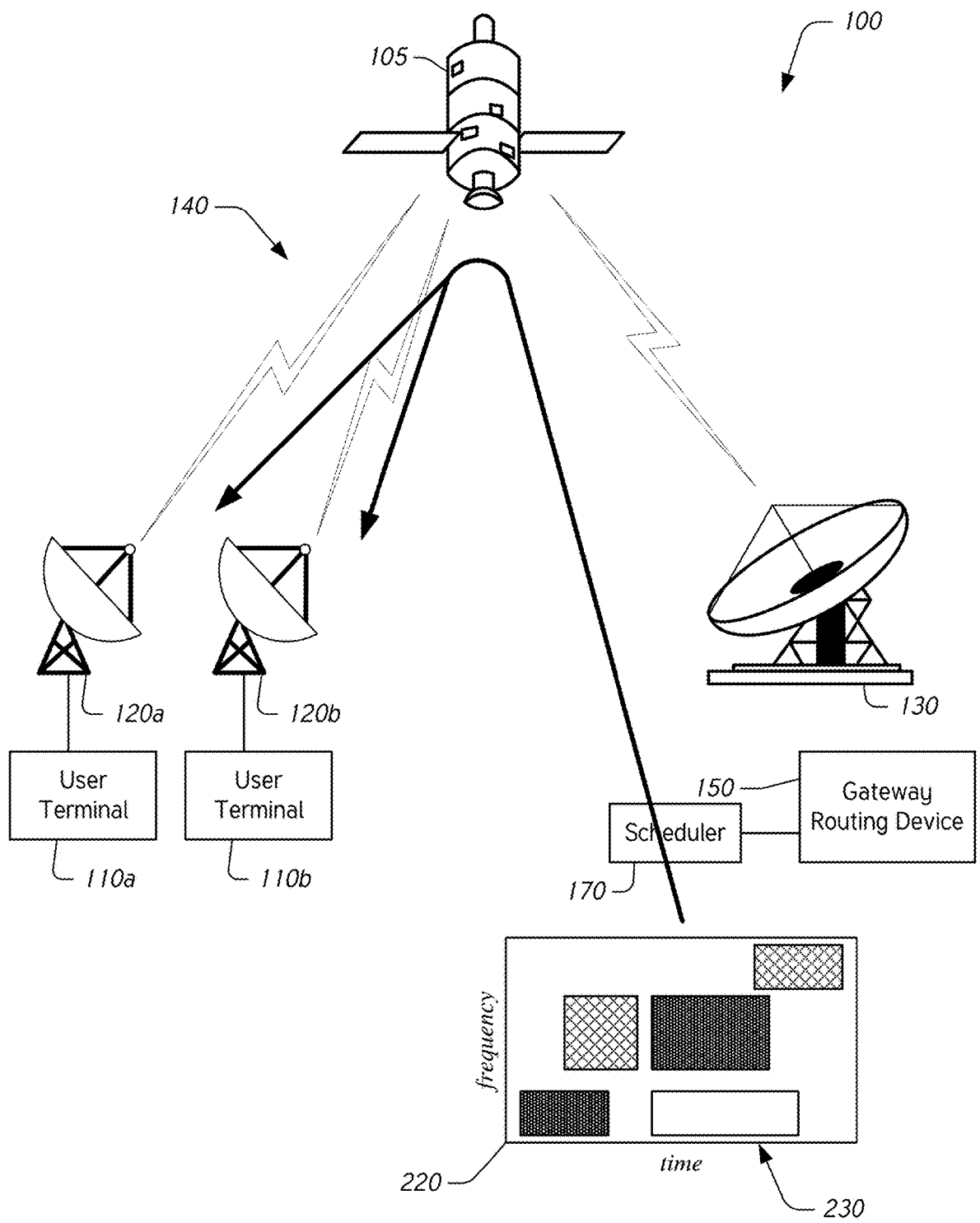
Figure 3C:
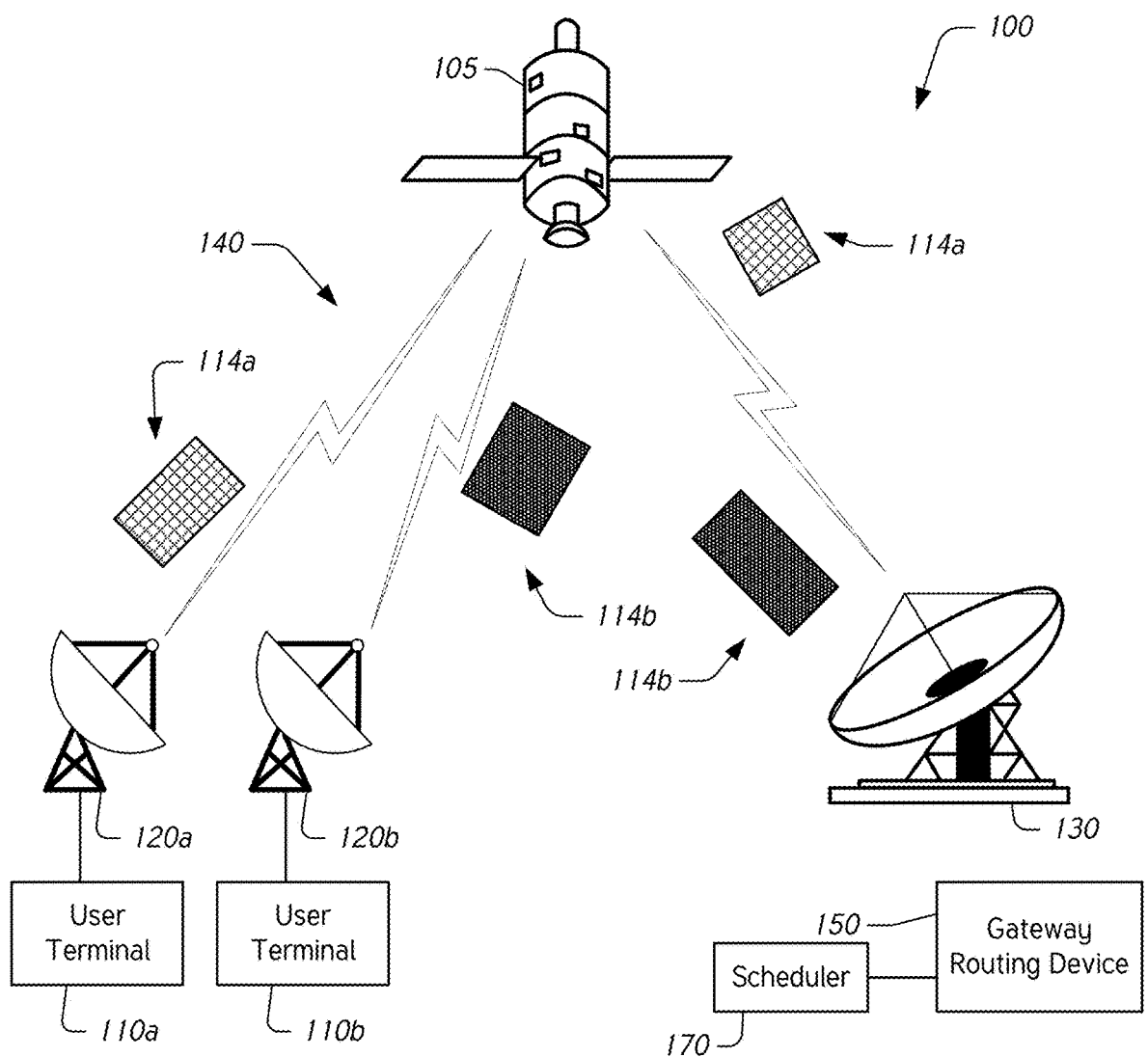

FIGS. 3A-3C illustrate an example of allocating resource grants to user terminals in the satellite communications network of FIG. 1. FIG. 3A illustrates that user terminal 110a is requesting return-link bandwidth on the return-link of the satellite network 140 for transmission of data 112a and user terminal 110b is requesting return-link bandwidth on the return-link of the satellite network 140 for transmission of data 112b. The user terminals 110a, 110b request return-link resources from the scheduler 170 based on buffer size, QoS parameters, and other flow parameters. FIG. 3B illustrates that the scheduler 170 allocates resource blocks 230 (time-frequency resources) in a slot 220 to serve the bandwidth requests from the user terminals 110a, 110b. These allocations are based on the demands from the user terminals 110a, 110b. The allocation can be transferred to the user terminals 110a, 110b as tables (e.g., RL-MAPs) via broadcast messages, multicast messages, or unicast messages. FIG. 3C illustrates that the user terminals 110a, 110b transmit data from their buffers in accordance with the time-frequency resources allocated by the scheduler 170 and transmitted by the gateway routing device 150. The user terminals 110a, 110b may use all or partial blocks of allocated resources.

To improve network load distribution, the scheduler 170 can be configured to randomize resource grants to spread out return-link communications in time. The scheduler 170 can be configured to define a randomized order of slots in which the scheduler 170 will proceed to allocate resource grants in each scheduling epoch. As disclosed herein, different groups of service flows (referred to herein as "pipes") can use different slot orders to achieve a more uniform load distribution in aggregate. In some embodiments, once a slot order for a pipe is defined in initialization, the same order is used across scheduling epochs. The scheduler 170 can be configured to allocate grants based on demands and quality-of-service (QOS) requirements. Similar to other schedulers, the scheduler 170 starts from the beginning of the scheduling epoch or follows the randomized order of the slots in the epoch without trying to make the grants uniformly distributed in time within the slots. Advantageously, this allows established algorithms to be used in conjunction with the randomization techniques disclosed herein. Then the scheduler 170 is configured to adjust the distribution of allocated grants in time, while maintaining scheduler constraints, to create a more uniform pattern. The scheduler 170 may accomplish this by randomly flipping approximately half of the resource grants (lossless flip), shifting all grants by adding a random time offsets for every slot and return carrier group (RCG) pair (a lossy shift), or by shifting all resource grants with a limit in the random time offset so that there is no wrap-around in the active slot (a lossless shift).

Figure 4A:
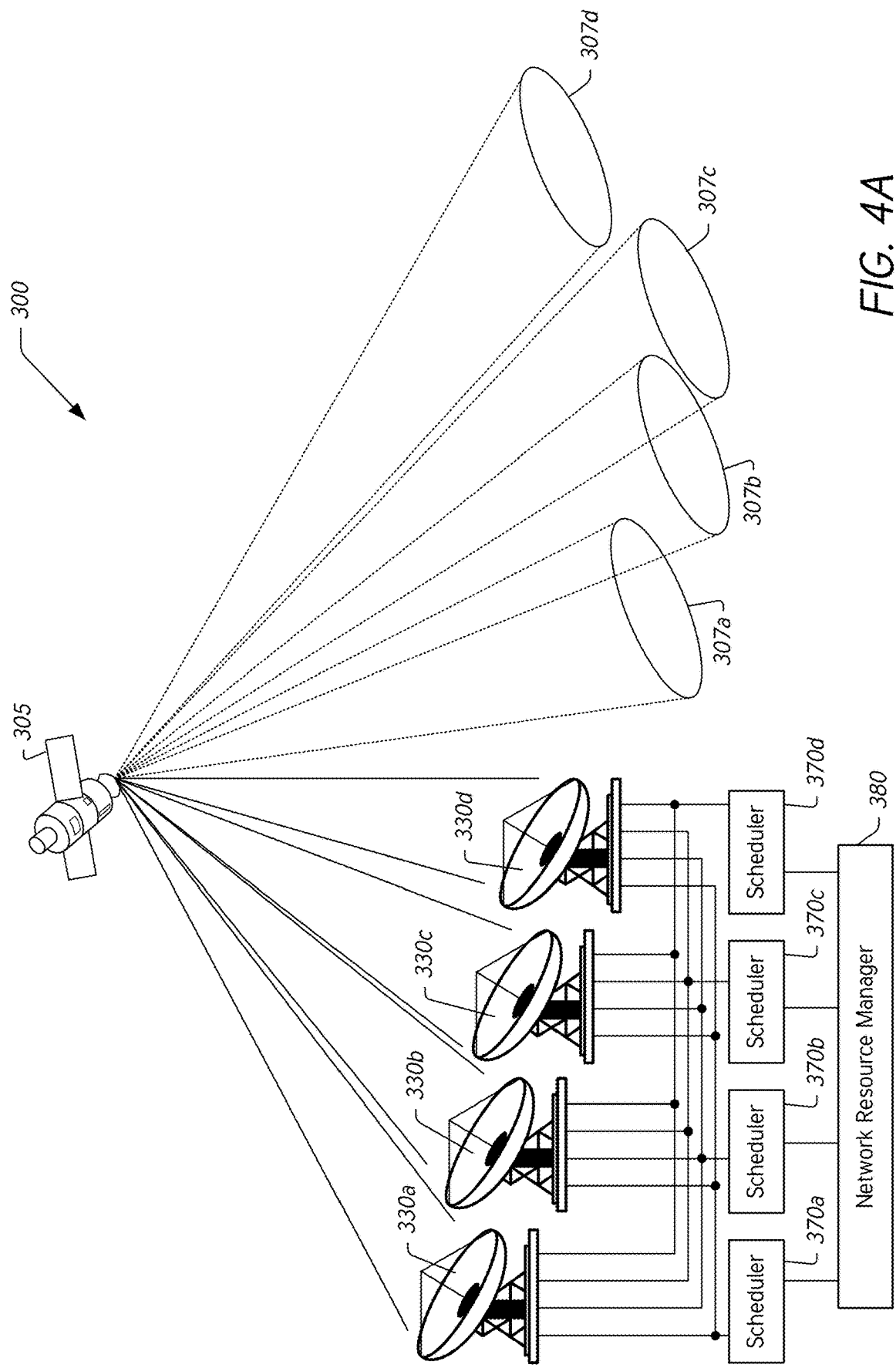
FIG. 4A illustrates another example satellite communications network with a satellite providing a plurality of beams with a plurality of schedulers to randomize resource grant allocation.

FIG. 4A illustrates another example satellite communications network 300 with a satellite 305 providing a plurality of beams 307a-307d, the example satellite communications network 300 further including a plurality of schedulers 370a-370d to randomize resource grant allocations to improve a transmission power profile and/or to distribute network load. The satellite communication network 300 also includes a network resource manager 380 configured to manage randomization of resource grant allocations across the schedulers 370a-370d. The schedulers 370a-370d are coupled to the satellite 305 through the plurality of ground stations 330a-330d to enable communication between the schedulers 370a-370d and the user terminals covered by the plurality of beams 307a-307d. In some embodiments, individual schedulers 370a-370d can be coupled to a plurality of ground stations 330a-330d. Similarly, individual ground stations 330a-330d can be coupled to a plurality of schedulers 370a-370d.

In some embodiments, the schedulers 370a-370d can each be configured to generate a randomizing map to randomize slot order for allocation of resource grants. Generation of the randomizing map can be independent from other schedulers. This may advantageously result in improved network load distribution by avoiding front-loading of frames and/or epochs when allocation resource grants due to independent randomization. Similarly, the schedulers 370a-370d can be configured to independently generate random time-shifts to adjust the start times of allocation grants within active slots to improve network load distribution by avoiding front-loading of slots within frames and/or epochs.

In certain embodiments, instead of the schedulers 370a-370d independently generating randomizing maps, the network resource manager 380 is configured to provide the randomizing maps to the schedulers 370a-370d. In such embodiments, the network resource manager 380 can be configured to randomly generate the randomizing maps or the network resource manager 380 can be configured to tailor the randomizing maps provided to the schedulers 370a-370d to distribute the load more evenly on the network, thereby improving transmission power profiles. Similarly, in some embodiments, the network resource manager 380 can be configured to generate time-shifts for each scheduler 370a-370d to adjust the start times of allocation grants within active slots to improve network load distribution by avoiding front-loading of slots within frames and/or epochs. In such embodiments, the network resource manager 380 can be configured to randomly generate the time-shifts or the network resource manager 380 can be configured to tailor the time-shifts provided to the schedulers 370a-370d to reduce front-loading of scheduling frames.

The satellite 305 can be configured to generate the plurality of beams 307a-307d to provide network communications to a plurality of user terminals in each beam 307a-307d. The satellite 305 may form the plurality of beams 307a-307d beams using a tunable active antenna array, examples of which are described in U.S. Pat. No. 10,484,080 issued Nov. 19, 2019 and entitled "GROUND NETWORK FOR END-TO-END BEAMFORMING WITH MULTI-FREQUENCY ACCESS NODE CLUSTERS," the entirety of which is incorporated by reference herein. In some embodiments, randomization of resource grant allocations can be performed for each beam 307a-307d. In certain embodiments, randomization of resource grant allocations can be performed by collections of service flows within a beam. In such embodiments, each scheduler 370a-370d can be configured to manage the randomizing maps and/or time shifts for each collection of service flows, wherein a collection of service flows can be referred to herein as a "pipe." In other words, a pipe is a collection of service flows to/from a set of user terminals that is handled in aggregate by a single scheduler entity. Thus, an individual scheduler 370a-370d is configured to manage randomizing maps and/or time shifts for one or more pipes provided by the plurality of beams 307a-307d.

In certain implementations, each beam 307a-307d can carry a plurality of aggregated service flows. In various implementations, individual beams 307a-307d may be served by a plurality of schedulers 370a-370d. In such implementations, a pipe can be defined as a collection of service flows serving a group of one or more user terminals that are scheduled with a common set of return link resources.

In certain embodiments, a randomizing map and/or time-shift parameter is associated with a particular pipe or beam and that randomizing map and/or time shift remains consistent across epochs and frames. For example, the randomizing map can be constant for a particular beam (or pipe) as long as the beam (or pipe) is active. The randomizing map and/or time shift can be generated by the scheduler associated with the pipe or by the network resource manager 380.

Figure 4B:
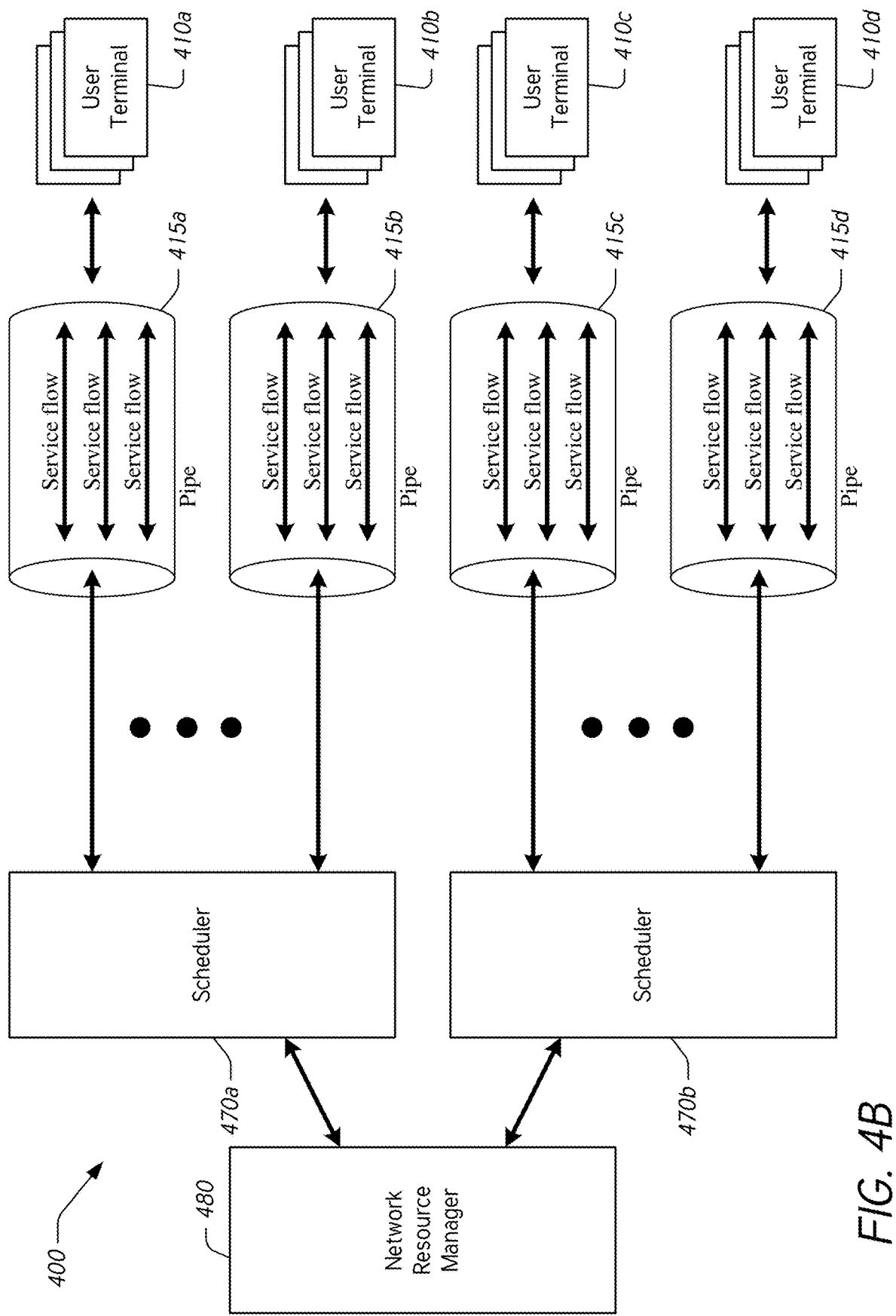
FIG. 4B illustrates an example communications network wherein user terminals are served with service flows grouped into pipes and a plurality of schedulers randomizing resource grant allocation for each pipe.

FIG. 4B illustrates another network communications system 400 wherein a network resource manager 480 manages a plurality of schedulers 470a-470b and each scheduler manages one or more pipes 415a-415d, wherein each pipe includes one or more service flows provided to one or more user terminals 410a-410d. In this network communications system 400, communication can be provided by satellites, by terrestrial-based equipment, or a combination of satellites and terrestrial networks. Thus, the concepts disclosed herein regarding randomizing resource grant allocations can be tied to pipes provided by any variety of network communications systems and do not require beams provided by satellite communications systems.

In some embodiments, randomization of resource grant allocations within a slot (e.g., intra-slot randomization) is generated and managed solely by the scheduler 470a-470b associated with the pipe 415a-415d. In such embodiments, the network resource manager 480 can be configured to provide randomizing maps for randomizing active slot order prior to resource grant allocations (e.g., inter-slot randomization) while not providing randomizing parameters for intra-slot randomization. As disclosed herein, intra-slot randomization can be provided individually by the schedulers 470a-470b and shifting or flipping start times of resource grants in an active slot can be performed on each active slot.

In some embodiments, the network resource manager 480 manages randomizing maps for the schedulers 470a, 470b. The randomizing maps can be generated based at least in part on overall network topology (e.g., a number of pipes and/or beams, which pipes are assigned to which schedulers, etc.). The randomizing maps can be generated and managed with a goal to improve transmission power profiles and/or overall network load across time slots on average. Such embodiments represent a centralized approach for generating slot reordering patterns. The randomizing maps can be generated to improve transmission power profiles, but it is not required that each randomizing map be unique for each scheduler or for each pipe. Some randomization methods do not result in a large number of different randomization possibilities; thus, some randomizing maps may be repeated for different schedulers or pipes. For example, where the randomizing map represents a slot offset in an epoch, and where epochs typically include about 20 slots, the number of unique randomization maps may be limited to 20 (or 21, including a shift of 0). Thus, two or more pipes may be assigned identical randomization maps. In network communications systems servicing thousands of pipes, repeated randomization maps may occur frequently. However, in such instances, the transmission power profile may be improved statistically due at least in part to resource grants being allocated more evenly in aggregate.

Examples of Interslot Randomization

Figure 5A:
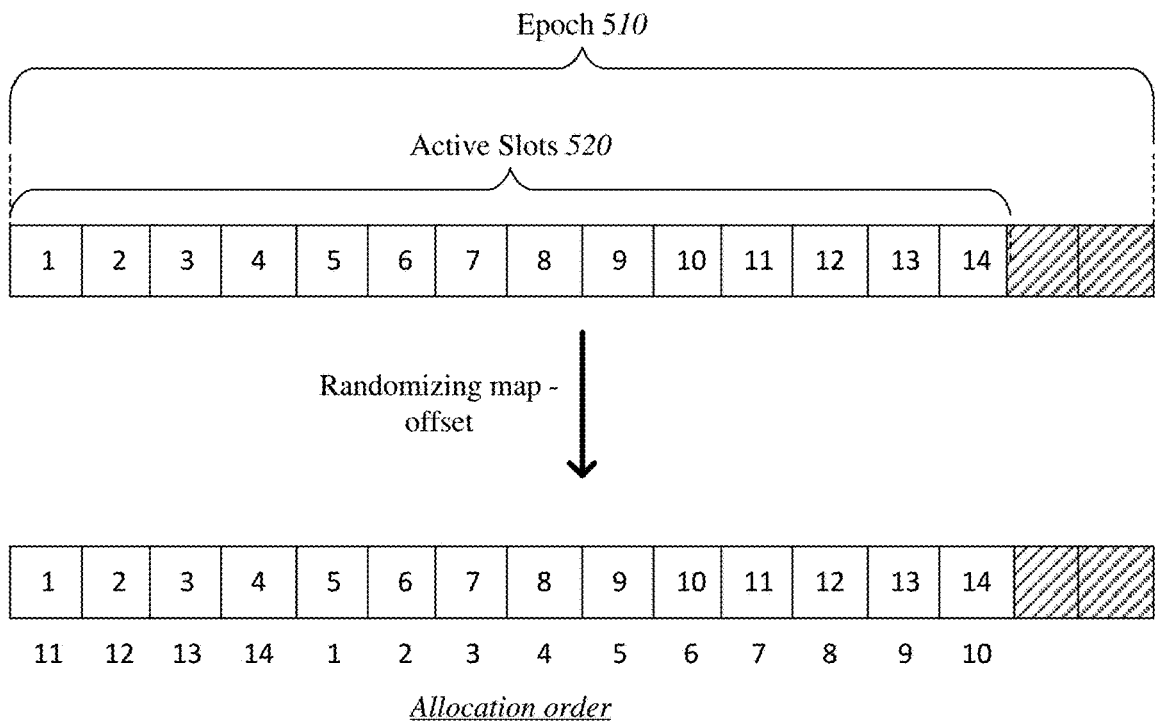
FIGS. 5A and 5B illustrate examples of randomizing maps for re-ordering active slots for resource grants allocations.
Figure 5B:
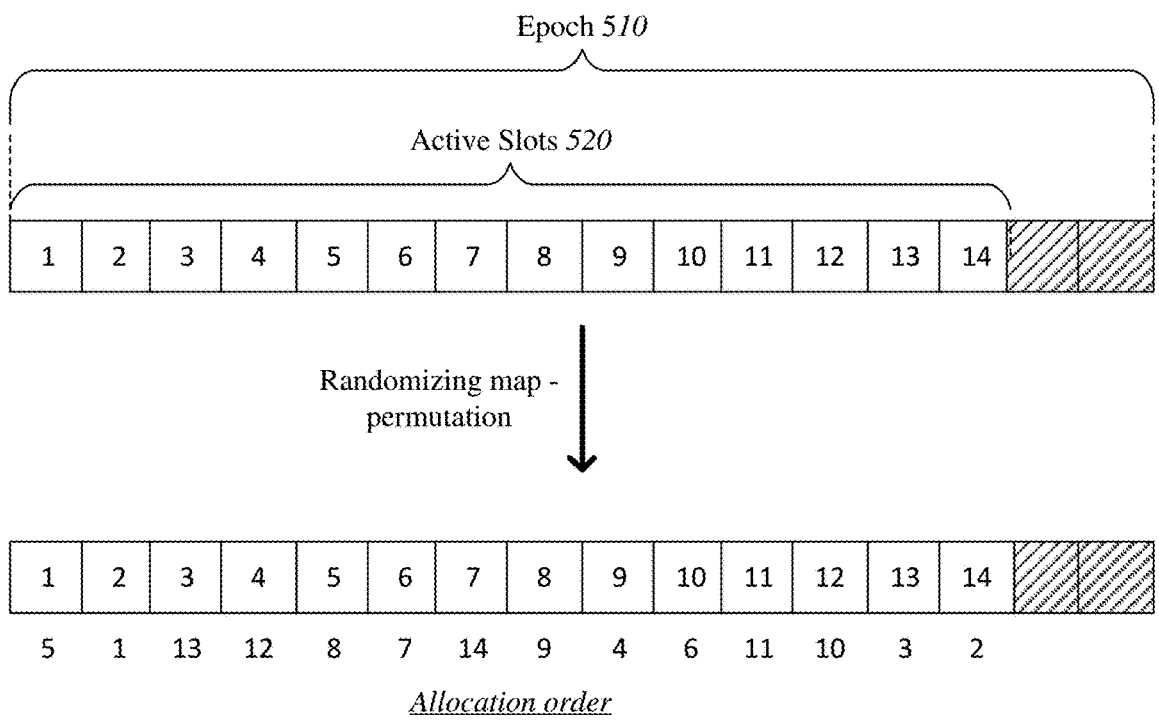

FIGS. 5A and 5B illustrate examples of randomizing maps for re-ordering active slots for resource grants allocations. As described herein with reference to FIG. 2, resource grants can be allocated using frames (or scheduling frames). These frames can be divided into slots (or scheduling slots) and slots can be grouped into epochs (or scheduling epochs). FIGS. 5A and 5B illustrate an epoch 510 with 16 slots, although it is to be understood that the number of slots in an epoch can be any suitable number other than 16. Further, within the epoch 510, a number of active slots 520 can be determined that may differ from the number of slots in the epoch 510. For example, there are 14 active slots 520 in the epoch 510, but this is not intended to be limiting, an epoch can have any suitable number of active slots other than 14 and, in certain implementations, the number of active slots can be the same as the number of slots in the epoch 510.

The number of active slots may be assigned by a network resource manager, such as any of the network resource managers described herein. The network resource manager may assign different sets of active slots to different pipes, depending on various constraints. To illustrate this, examples are provided with respect to a pipe A, a pipe B, a beam A, and a beam B.

As a first example, pipes A and B belong to beams C and D which are respectively served by schedulers (e.g., schedulers 470a and 470b). These two beams may be geographically close, and hence transmissions on these beams may create cross-interference. In this case, the network resource manager may assign non-overlapping slots to pipe A (e.g., slots 1-8) and to pipe B (e.g., slots 9-16).

As a second example, pipe A and pipe B are on beam C and beam D, respectively. Beams C and D may be handled by different reflectors on the satellite (e.g., satellite 305), in which case the active slots may be on different parts of the frame. For example, slots 1-16 are active slots on pipe A, while slots 33-40 are active slots on pipe B.

As a third example, a mobility pipe serving an airplane may have fewer active slots than a fixed pipe serving hundreds of residential customers.

As a fourth example, pipe A and pipe B are on beams C and D, respectively. Beams C and D may be operating on different frequencies, in which case the active slots may overlap between the two beams. For example, slots 1-16 are active on pipe A and the same slots 1-16 are active on pipe B.

In each of these examples, the active slots may not necessarily be contiguous (e.g., an active slot set of 1, 3, 6, 10 is acceptable).

As described herein, a scheduling epoch is a contiguous set of slots (e.g., slots 1-16) for which the scheduler assigns grants to multiple service flows based at least in part on demand. During a particular epoch, different pipes with different sets of active slots (that overlap with the epoch) can be scheduled. The active slots can be associated with the pipes and assigned by the network resource manager whereas the scheduler epoch is associated with a scheduler.

The active slots 520 are shown as being indexed based on their chronological order within the epoch 510. These indices can be randomized so that resource blocks are allocated to slots based on an allocation order that differs from the chronological order, examples of which are described below. Thus, each of the plurality of active slots 520 in the epoch 510 (or frame) includes an index corresponding to an order in time of the plurality of active slots 520 and the randomizing map comprises a random order of the indices of the plurality of active slots 520. The randomizing map thus generates an allocation order that is typically different from the chronological order of the active slots. The allocation order is thus the random order of the indices of the plurality of active slots.

The randomizing map may differ for different schedulers or for different pipes. The result is that overall network load is redistributed in time since each scheduler generates its own randomizing map for each pipe. The expectation is that the randomized allocation order improves transmission power profiles due to more evenly distributing resource grant allocations in time.

FIG. 5A illustrates a randomization map comprising a random slot offset. The random slot offset represents a number between 0 and the largest index for the slots in the epoch 510. In some embodiments, the randomizing map is generated prior to determining the active slots in an epoch. In such embodiments, the randomizing map is used to re-order the active slots 520 in the epoch 510 even though the number of active slots 520 may differ from the number of slots in the epoch 520 (e.g., 14 active slots versus 16 total slots in this example). The random slot offset is then used to generate a new starting position for an allocation order. The allocation order is the order in which slots are assigned resource grant allocations. Thus, in the example of FIG. 5A, the random slot offset is 4 so the first active slot that the scheduler assigns resource blocks to is the fifth active slot in the epoch 520. The allocation order continues to follow the chronological order and, when reaching the last active slot in the epoch (chronologically speaking), the allocation order loops back to the first active slot in the epoch (chronologically speaking). Thus, in the illustrated example, the allocation order is 5, 6, 7, 8, 9, 10, 11, 12, 13, 14, 1, 2, 3, 4, meaning that this is the order the scheduler will use to allocate resource blocks to active slots 520.

FIG. 5B illustrates a randomizing map comprising a permutation of the active slot indices. The randomizing map assigns each active slot index a unique random number between 1 and the total number of active slots 520 in the epoch (e.g., 14 in this example). The unique random number is then used as the new index to generate the allocation order. Thus, in the illustrated example, the allocation order is active slot 2, 14, 13, 9, 1, 10, 6, 5, 8, 12, 11, 4, 3, 7, meaning that this is the order the scheduler will use to allocate resource blocks to active slots 520.

Figure 6:
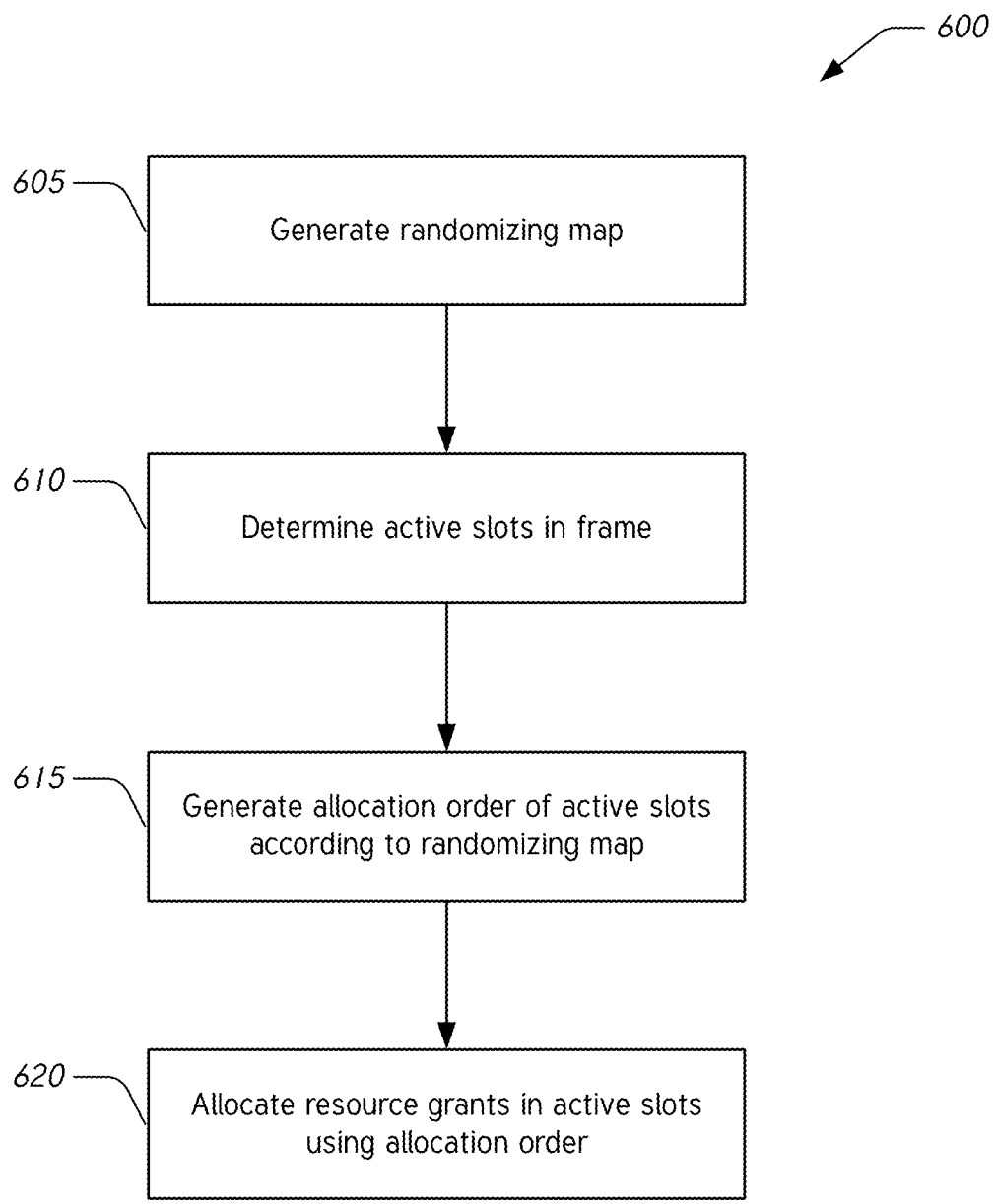
FIG. 6 illustrates a flow chart of an example method for randomizing the order of active slots prior to allocating resource grants on a communications network.

FIG. 6 illustrates a flow chart of an example method 600 for randomizing the order of active slots prior to allocating resource grants on a communications network. Resource grants are allocated using frames each having a plurality of slots that are ordered based on a position in time of a slot in a corresponding frame, as described herein with reference to FIGS. 2, 5A, and 5B. The method 600 can be performed in any of the schedulers or network resource managers described herein with reference to FIG. 1, 3A-3C, 4A, or 4B or by a combination of a scheduler and a network resource manager. However, for ease of description, the method 600 will be described as being performed by a scheduler. This is not to be understood to limit the scope of the disclosure. Rather, any step or portion of the method 600 can be performed by any component or combination of components of the communications networks described herein.

At block 605, the scheduler generates a randomizing map to randomize an order for allocating resource grants to slots in a frame. The randomizing map can be any suitable randomization of the order of slots in a frame, including a random slot offset and a permutation of the indices of the slots.

At block 610, the scheduler determines a plurality of active slots for a current frame or epoch. The plurality of active slots is a subset of the plurality of slots in the current frame or epoch to be used to allocate resource grants. In some instances, the number of active slots is the same as the total number of slots in the frame or epoch.

At block 615, the scheduler generates an allocation order for the plurality of active slots according to the randomizing map. The allocation order is different from a time order of the plurality of active slots in the current frame or epoch, as described herein. The different order may include starting with a different active slot and then proceeding chronologically through the active slots and looping back to the first chronological active slot. The different order may include proceeding through the active slots in an order different from the chronological order of the active slots, skipping forward and backward through the active slots.

At block 620, the scheduler proceeds through the plurality of active slots in the allocation order to allocate resource grants within individual active slots. Allocating resource grants may be accomplished using standard scheduling techniques. Allocating resource grants may be constrained using standard constraints. Thus, the method 600 can be implemented without requiring new scheduling algorithms while advantageously improving network load distribution.

In some embodiments, allocation of resource grants is constrained such that a single user terminal is not scheduled to transmit on multiple frequency channels simultaneously. In certain embodiments, a user terminal may include a plurality of transmitters capable of simultaneously transmitting on different frequency channels and this constraint is ignored or not enforced when allocating resource grants. In some embodiments, allocation of resource grants is constrained such that multiple user terminals within a pipe or beam are not scheduled to simultaneously transmit on identical frequency channels. In some embodiments, individual slots in a frame or epoch include one or more resource block allocations to one or more user terminals. In such embodiments, individual resource block allocations can include an allocation of time and frequency within an individual slot. In certain implementations, allocating resource grants comprises allocating return-link bandwidth.

In some embodiments, the randomizing map for a pipe or beam remains unchanged over a plurality of frames or the randomizing map is constant while a pipe or beam is active. In certain embodiments, each randomizing map is randomly generated to improve network load distribution based at least in part on statistical randomization. In various embodiments, a network resource manager generates the randomizing map that is assigned to a particular pipe or beam to improve overall network load across slots on average.

Figure 7:
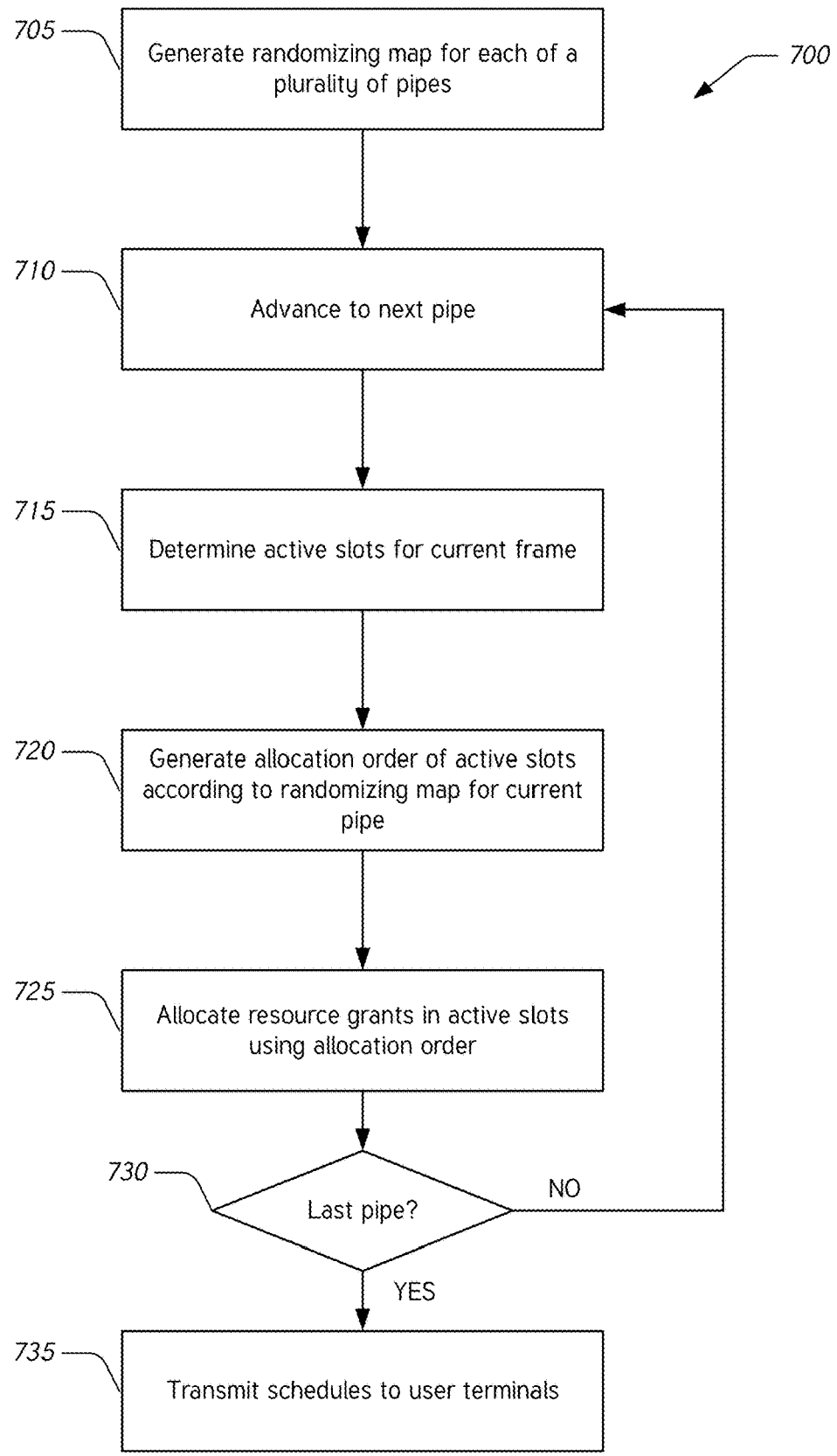
FIG. 7 illustrates a flow chart of an example method for randomizing the order of active slots prior to allocating resource grants on a communications network with different randomizing maps for different pipes of service flows.

FIG. 7 illustrates a flow chart of an example method 700 for randomizing the order of active slots prior to allocating resource grants on a communications network with different randomizing maps for different pipes of service flows. Resource grants are allocated using frames each having a plurality of slots that are ordered based on a position in time of a slot in a corresponding frame, as described herein with reference to FIGS. 2, 5A, and 5B. The method 700 can be performed in any of the network resource managers described herein with reference to FIG. 4A or 4B or by a combination of a scheduler and a network resource manager. However, for ease of description, the method 700 will be described as being performed by a network resource manager. This is not to be understood to limit the scope of the disclosure. Rather, any step or portion of the method 700 can be performed by any component or combination of components of the communications networks described herein.

At block 705, the network resource manager generates a randomizing map for each of a plurality of pipes. Each pipe is a collection of one or more service flows. In a satellite communications network, a beam can service one or more pipes. The randomizing map is configured to randomize an order for allocating resource grants to slots in frames or epochs. The network resource manager can be configured to generate and assign the randomizing maps to individual schedulers to improve network load distribution. In some embodiments, the network resource manager selects the randomizing maps using an algorithm that considers current and predicted network loads, network capacity, quality of service parameters, and the like. The algorithm is configured to generate randomizing maps that advantageously distribute network load to increase quality of service, to decrease network bandwidth bottlenecks, and/or to reduce power consumption. In certain embodiments, the network resource manager randomly generates and assigns the randomizing maps. This can be done with the expectation that statistical variations will result in a relatively even distribution of network load.

At block 710, the network resource manager advances through each pipe of the plurality of pipes and performs each of the steps 715, 720, and 725 for the current pipe. In some embodiments, a scheduler corresponding to the current pipe or beam performs the steps 715, 720, and 725. Because these steps are similar to the corresponding steps in the method 600, only a brief description of the steps is provided here.

At block 715, the scheduler determines a plurality of active slots for a current frame of the beam. At block 720, the scheduler generates an allocation order for the plurality of active slots according to the randomizing map of the pipe or beam. At block 725, the scheduler proceeds through the plurality of active slots in the allocation order to allocate resource grants within individual active slots.

At block 730, the network resource manager determines whether all of the pipes have been randomized. If so, the network resource manager moves to block 735 to transmit the resulting schedules to the user terminals. If not, the network resource manager returns to block 710 and advances to the next pipe due for resource block allocation.

In some embodiments, allocation of resource grants is constrained such that a single user terminal is not scheduled to transmit on multiple frequency channels simultaneously. In certain embodiments, a user terminal may include a plurality of transmitters capable of simultaneously transmitting on different frequency channels and this constraint is ignored or not enforced when allocating resource grants. In some embodiments, allocation of resource grants is constrained such that multiple user terminals within a pipe or beam are not scheduled to simultaneously transmit on identical frequency channels. In some embodiments, individual slots in a frame or epoch include one or more resource block allocations to one or more user terminals. In such embodiments, individual resource block allocations can include an allocation of time and frequency within an individual slot. In certain implementations, allocating resource grants comprises allocating return-link bandwidth.

The method 700 causes a randomizing map to be assigned to individual pipes or beams. The randomizing map can be fixed for a particular pipe or beam while that pipe or beam is active. If a new beam or pipe is added, a new randomizing map can be generated and assigned to the new pipe or beam.

Examples of Intraslot Randomization

FIGS. 8A, 8B, 8C, and 8D illustrate examples of shifting resource grants within an active slot to distribute network load in a communications network. These examples illustrate shifting start times of allocated resource grants within a slot, and thus may be referred to as intraslot randomization. This is different from randomizing the allocation order of slots, as described above, which may be referred to as interslot randomization. For the examples illustrated in FIGS. 8A-8C, slots 820a-820c are represented with corresponding resource blocks 830a-830c allocated within the slot 820a-820c. The resource blocks 830a-830c are represented as boxes with differing fill patterns to represent unique resource grants. Each slot 820a-820c is grouped into a return-link carrier group (RCG) in the frequency domain. Thus, slot 820a is also referred to as RCG1, slot 820b is also referred to as RCG2, and slot 820c is also referred to as RCG3. Each resource block in its corresponding slot is represented as a block where extent along the x-axis represents a duration, extent along the y-axis represents a frequency channel, and a position of the left edge represents a start time of the allocated resource block.

Intraslot randomization can be performed for individual slots in a frame. This can be done independently of the interslot randomization. In addition, the benefits of intraslot randomization may be realized for a single pipe whereas at least some of the benefits of interslot randomization flow from statistical effects that arise due to randomization across different pipes or beams. Intraslot randomization can be tied to a group of channels that are scheduled together, the return-link carrier groups (RCGs). Individual RCGs can include a set of frequency channels allocated to a collection of user terminals. In some implementations, the intraslot randomization examples presented below can be mutually exclusive.

Figure 8A:
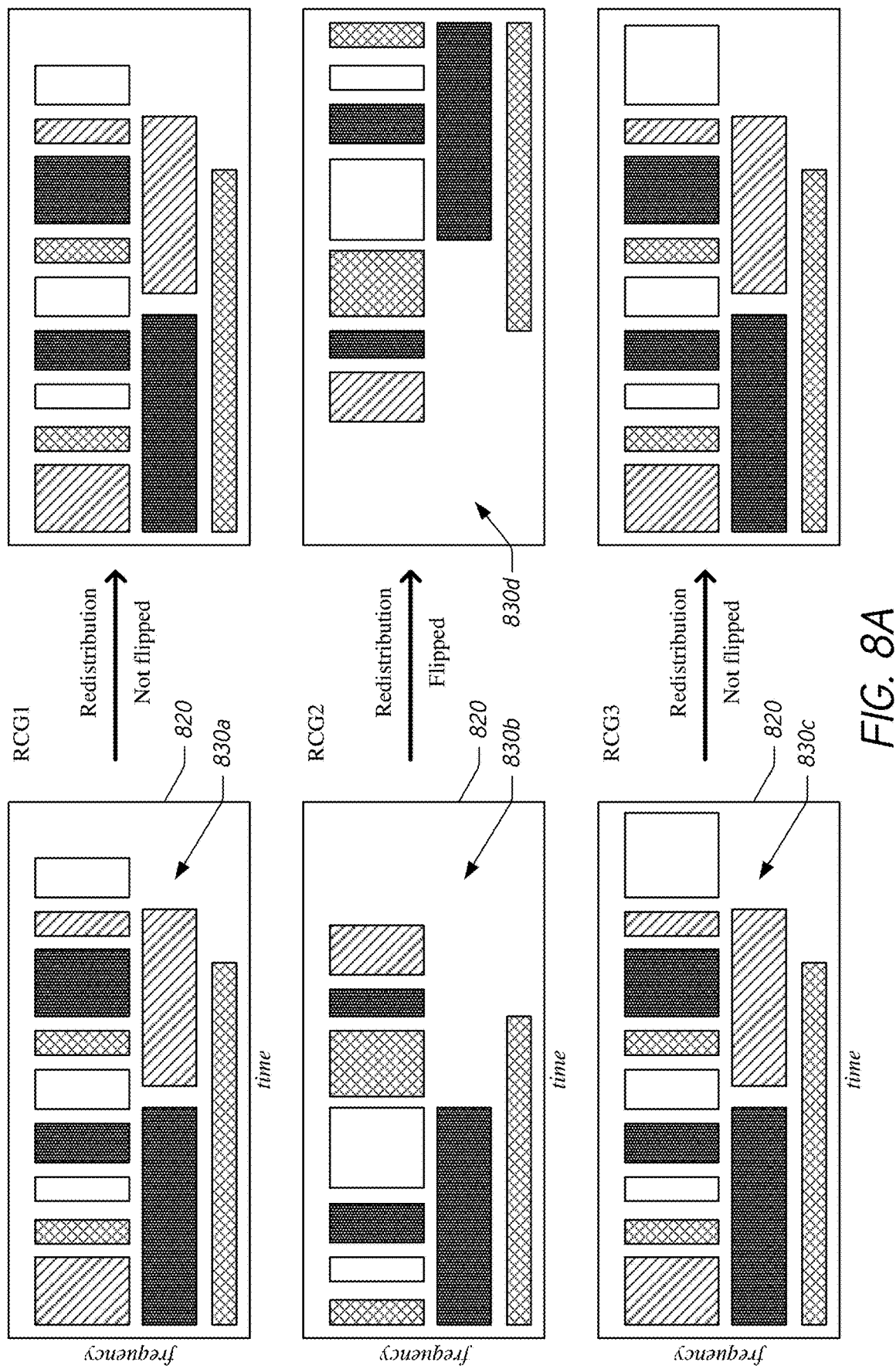

FIG. 8A illustrates an example of inverting or flipping resource block allocations in the time domain where the duration of each resource block is maintained. Thus, the example in FIG. 8A may be referred to as a lossless flip because the duration, and hence the amount of data allocated, remains unchanged.

A scheduler can perform a lossless flip by randomly selecting approximately half of the RCGs and inverting or flipping the start times of the resource blocks in the selected RCG. As shown in FIG. 8A, RCG2 is selected to be flipped. The resulting flipped slot results in resource blocks 830d, which represents a mirror image (in the time domain) of the resource blocks 830b. Flipping the resource blocks maintains their duration but changes their start times.

Figure 8B:
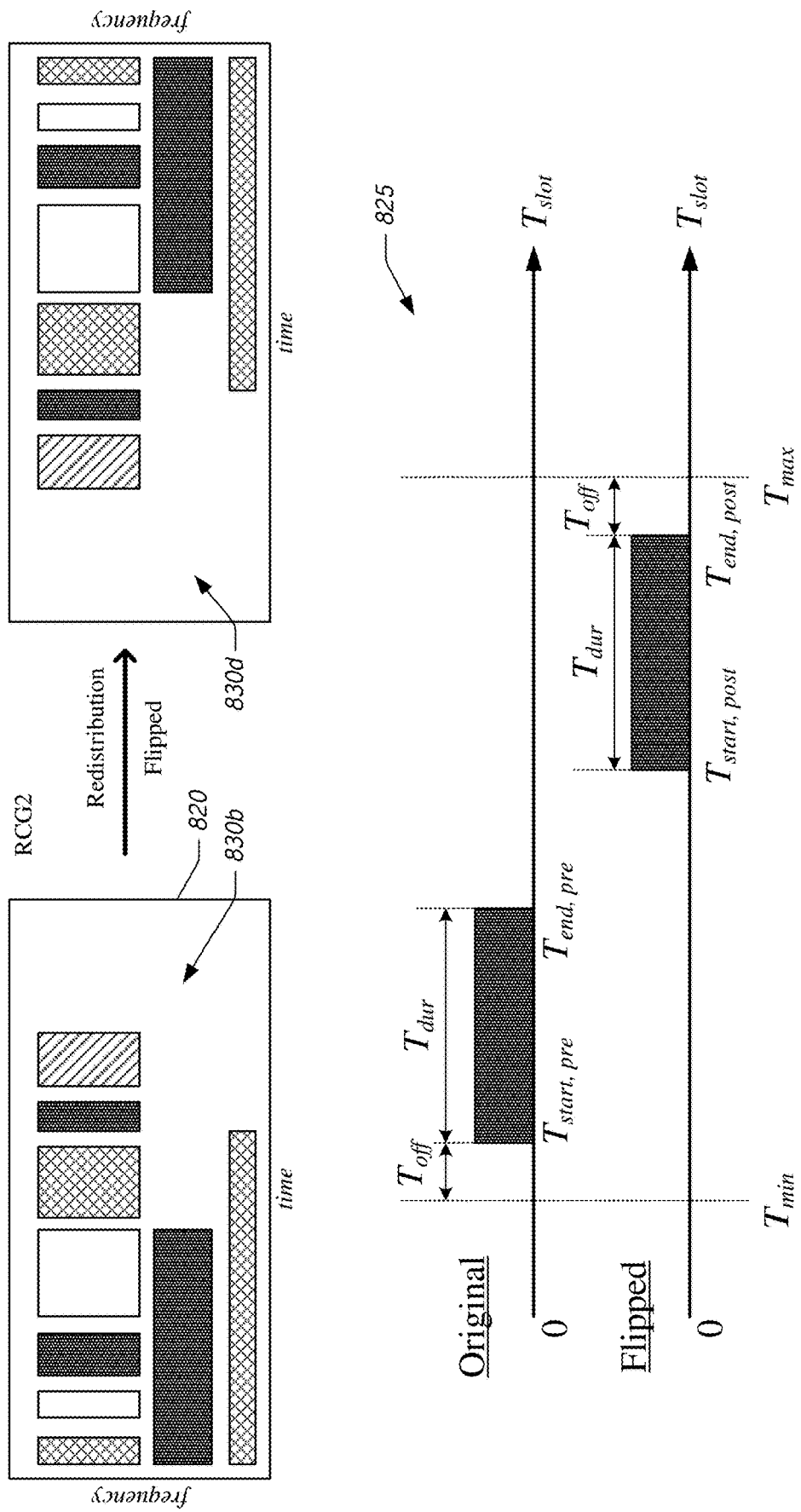

An example of flipping resource blocks is shown in the diagram 825 in FIG. 8B. In the diagram 825, time is represented on a horizontal access and the total duration of the slot is $T_{slot}$. The duration of the slot, $T_{slot}$, is fixed. In practice, there may be some guard time at the beginning and end of a slot. This is represented as $T_{min}$ and $T_{max}$ of the slot corresponding to the start and end, respectively, of the allowable scheduling window in the slot. In some embodiments, for partially scheduled slots (e.g., reflector switching), the value of $T_{max}$ is configured based on an outage interval. These values can be configured to account for guard times at the beginning and end of slots. Guard times may be beneficial in allowing hardware components at the satellite or terminal devices to settle during slot transitions, for example. This calculation assumes that start and end times of the slot are adjusted with respect to any guard times. A resource block has a start time, $T_{start,pre}$, that begins after a time offset, $T_{off}$, from the beginning of the slot, $T_{min}$, such that $T_{start,pre} = T_{off} + T_{min}$. The time offset depends on the time allocation assigned by the scheduler prior to any flipping or other adjustment. The resource block has an end time, $T_{end,pre}$, determined by the duration, $T_{dur}$, of the resource block such that $T_{end,pre} = T_{start,pre} + T_{dur}$. This is shown as the "original" resource block in the top portion of the diagram 825. This block is flipped and shown in the bottom portion of the diagram 825, label "flipped." The flip involves moving the block within the slot such that the end time of the block after the flip, $T_{end,post}$, is now a distance in time equal to the time offset, $T_{off}$, from the end of the allowable scheduling window in the slot, $T_{max}$, such that $T_{end,post} = T_{max} - T_{off}$. The magnitude of the time offset is fixed and does not change in the process of flipping the resource block. This results in the start time after the flip, $T_{start,post}$, being moved based on the duration, Tour, wherein the duration does not change in the process of flipping the resource block. In other words, $T_{start,post} = T_{end,post} - T_{dur}$.

The lossless flip, along with the other intraslot randomization techniques disclosed herein, does not affect frequency channel allocations. Once a slot of a return carrier group is selected for flipping, then all resource grants to all frequency channels are flipped for that RCG slot.

Intraslot randomization includes randomly distributing allocated resource grants in time. A lossless flip includes inverting a time order of resource grants in a return channel group for randomly selected slots. Inverting the time order includes recalculating a start time of each resource grant in the return channel group while maintaining a duration of each resource grant. By randomly selecting approximately half of the plurality of return channel groups, the load distribution will result in a mixture of front- and back-loaded grants. With this technique, there is a possibility of a dip in the center of slot. Advantageously, there is no loss in capacity with the lossless flip and is relatively simple to implement because there is a simple equation involved in recomputing the start times of flipped resource grants.

Figure 8C:
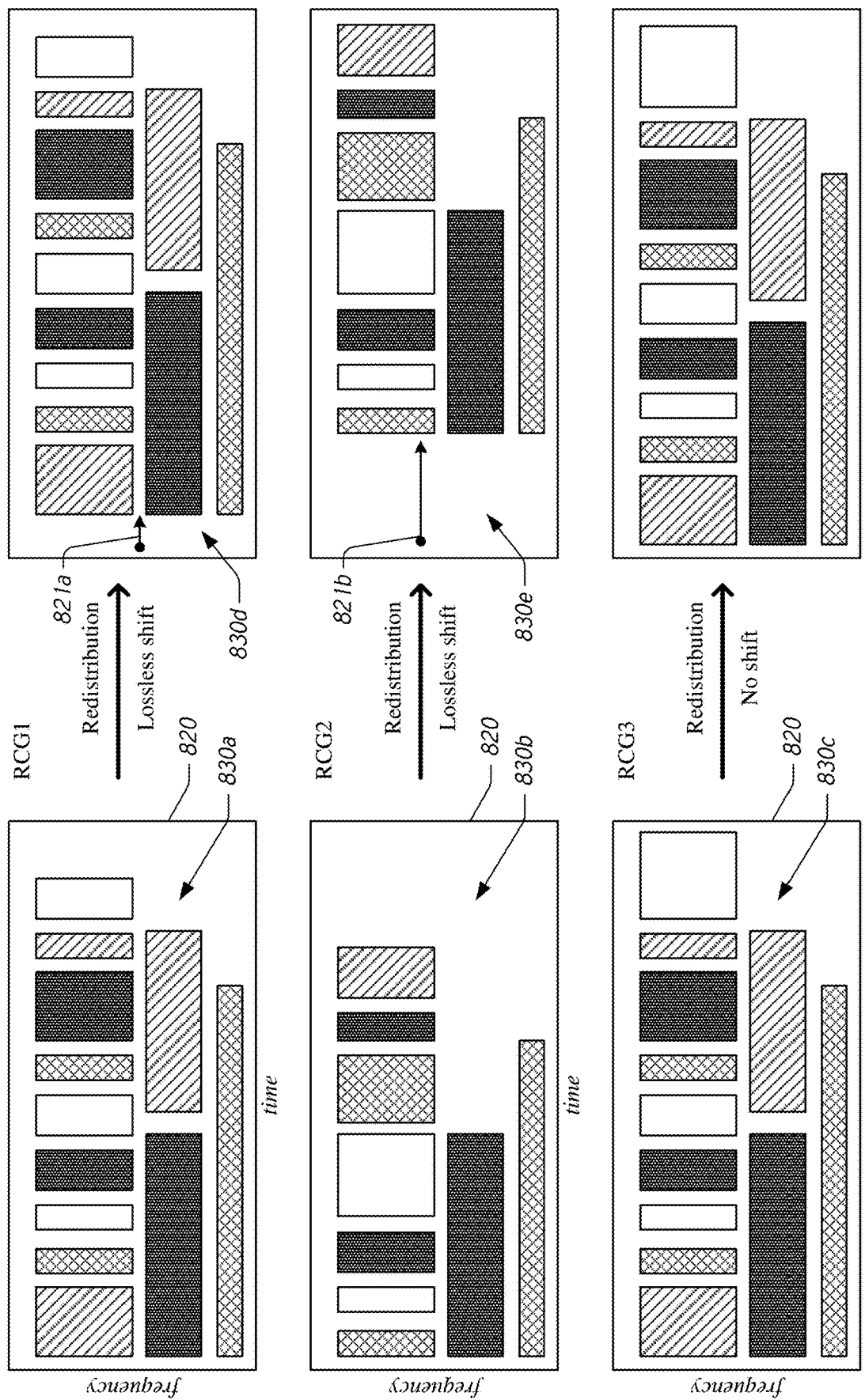

FIG. 8C illustrates an example of shifting the start times of all the resource blocks in a slot by a random time offset. The random time offset is limited such that no resource block allocation extends past the end of the slot (or past the guard time at the end of the slot). Thus, the example in FIG. 8B may be referred to as a lossless shift because the duration, and hence the amount of data allocated, remains unchanged.

Figure 8D:
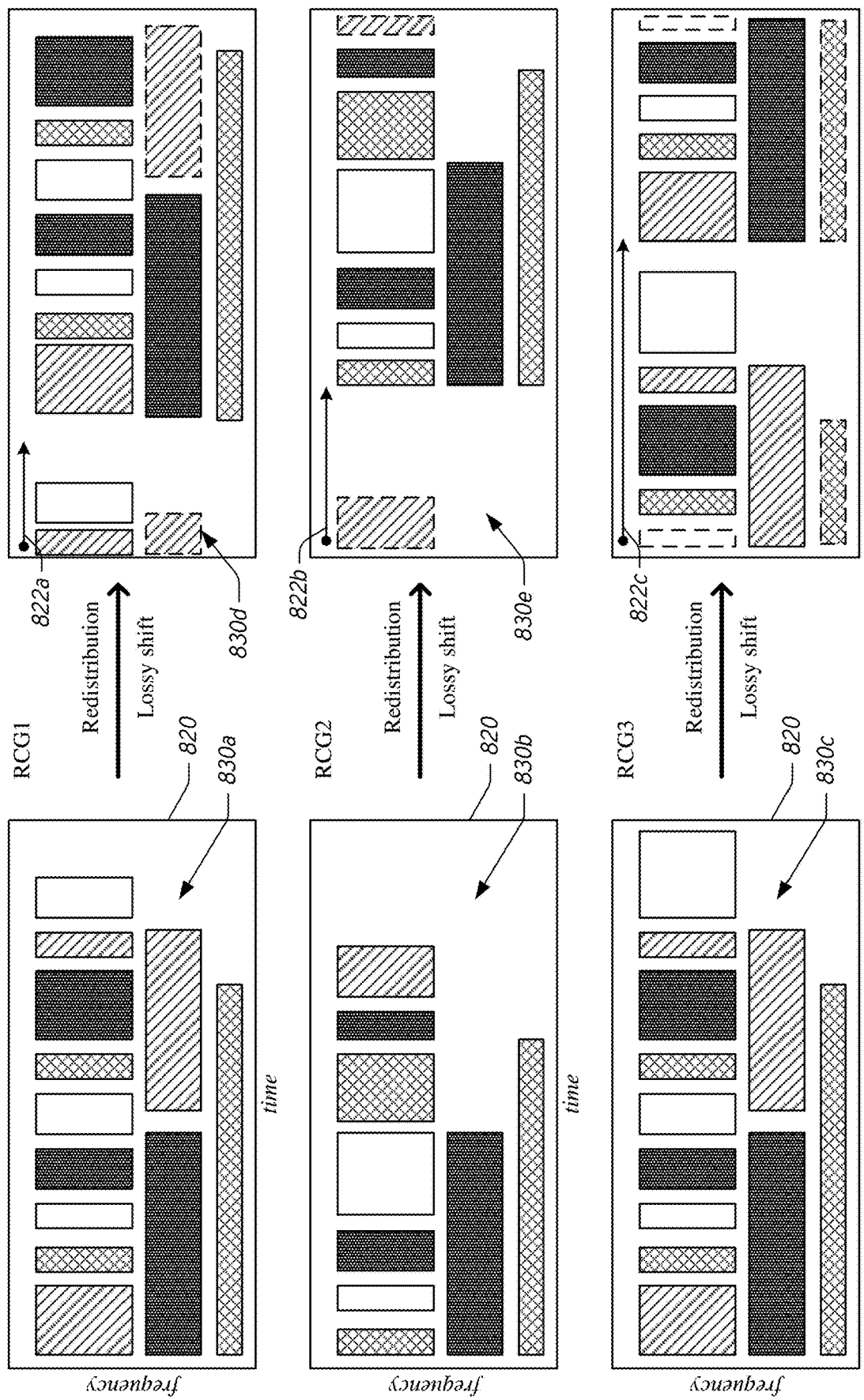

FIG. 8D illustrates that RCG1 resource blocks 830a and RCG2 resource blocks 830b are randomized using a lossless shift, resulting in slots with shifted resource blocks 830d, 830e, respectively. However, RCG3 resource blocks 830c receive no shift because the current resource grants occupy the entire duration of the slot, thus any shift would result in pushing a resource grant off the end of the slot. For the lossless shift, this is not allowed and hence the RCG3 resource blocks 830c remain unchanged. For RCG1 resource blocks 830d, a first random time offset 821a is used to shift the start times of each resource block 830a to result in the shifted resource blocks 830d. Similarly, for RCG2 resource blocks 830e, a second random time offset 821b is used to shift the start times of each resource block 830b to result in the shifted resource blocks 830e. The size of the random time offset is limited so that no resource block extends past the end of the slot in which it is allocated.

Thus, the lossless shift of FIG. 8C includes distributing allocated resource grants in time by shifting a start time of each resource grant within a slot by a random time offset. The random time offset is limited such that none of the resource grants in the slot extend beyond an end of the slot. Consequently, the network load distribution may be more evenly loaded with respect to non-shifted implementations. Advantageously, the lossless shift does not result in any loss in capacity and may be relatively easy to implement.

FIG. 8D illustrates an example of shifting the start times of all the resource blocks in a slot by a random time offset, similar to the lossless flip of FIG. 8C. However, in FIG. 8D, the random time offset is allowed to move resource block allocations past the end of the slot. Where a resource block allocation is shifted past the end of the block, the block may be moved to the beginning of the slot or a portion of the resource block that extends past the end of the slot may be fragmented so that a portion remains at the end of the slot and a portion is moved to the beginning of the slot. Where a resource block is fragmented, the total duration, and hence the amount of data allocated, may be reduced. Thus, the example in FIG. 8C may be referred to as a lossy shift because some resource blocks may have their duration, and hence the total amount of data allocated, reduced.

FIG. 8D illustrates that the resource blocks 830a of RCG1 are shifted by a first random time offset 822a resulting in the resource blocks 830d, the resource blocks 830b of RCG2 are shifted by a second random time offset 822b resulting in the resource blocks 830e, and the resource blocks 830c of RCG3 are shifted by a third random time offset 822c resulting in the resource blocks 830f. For the lossy shift, all resource grants are shifted in time by adding random time offsets for every slot, RCG pair. A resource grant that is divided due to the shift in time results in a reduced resource allocation relative to the corresponding resource grant prior to shifting the start time. A resource grant that extends past the end of the slot due to the random time shift can be dropped, truncated, fragmented, or wrapped. A resource grant that is dropped is no longer included in the slot. A resource grant that is truncated has the portion of the grant that extends past the end of the slot removed, thereby reducing the capacity allocated. A resource grant that is fragmented has a portion that remains at an end of the slot and a portion that is moved to the beginning of the slot. Fragmentation may result in a reduction of allocated data, as described below. A resource grant that is wrapped is wholly moved to the start of the slot, resulting in no loss of allocated capacity. In FIG. 8D, the resource blocks that are wrapped, truncated, or fragmented are represented with dashed outlines. The lossy shift intraslot randomization technique may result in reduced allocated capacity and some resource grants may require future reassignment. The lossy shift intraslot randomization technique may result in superior network load distribution while possibly being more complex to implement relative to the lossless flip and the lossless shift.

Figure 8E:
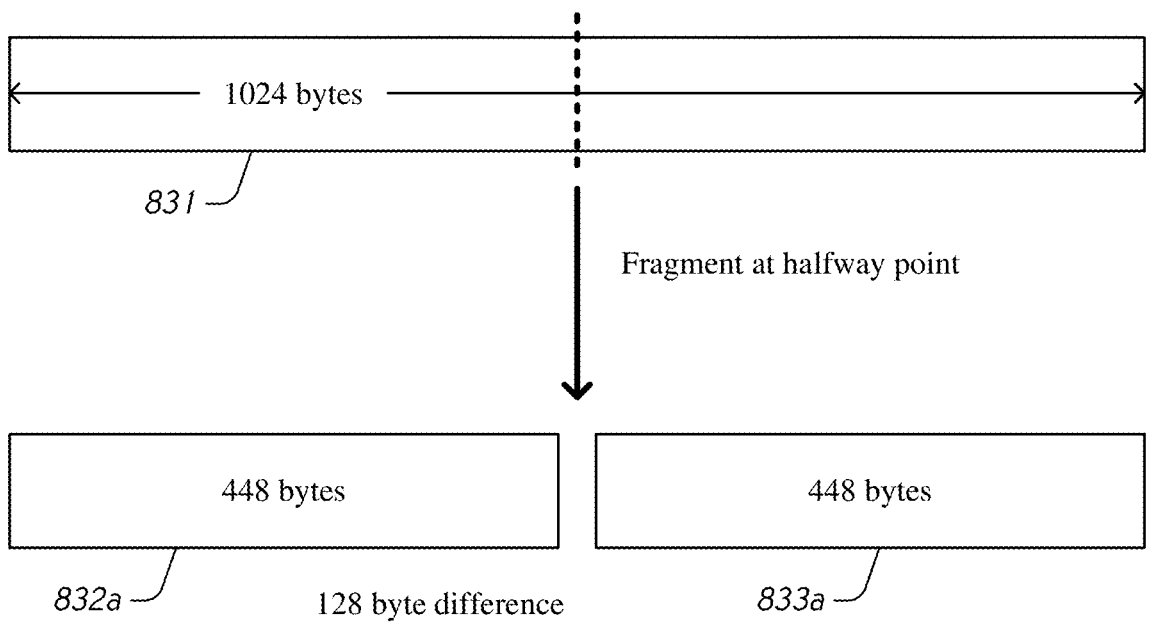
Figure 8E:
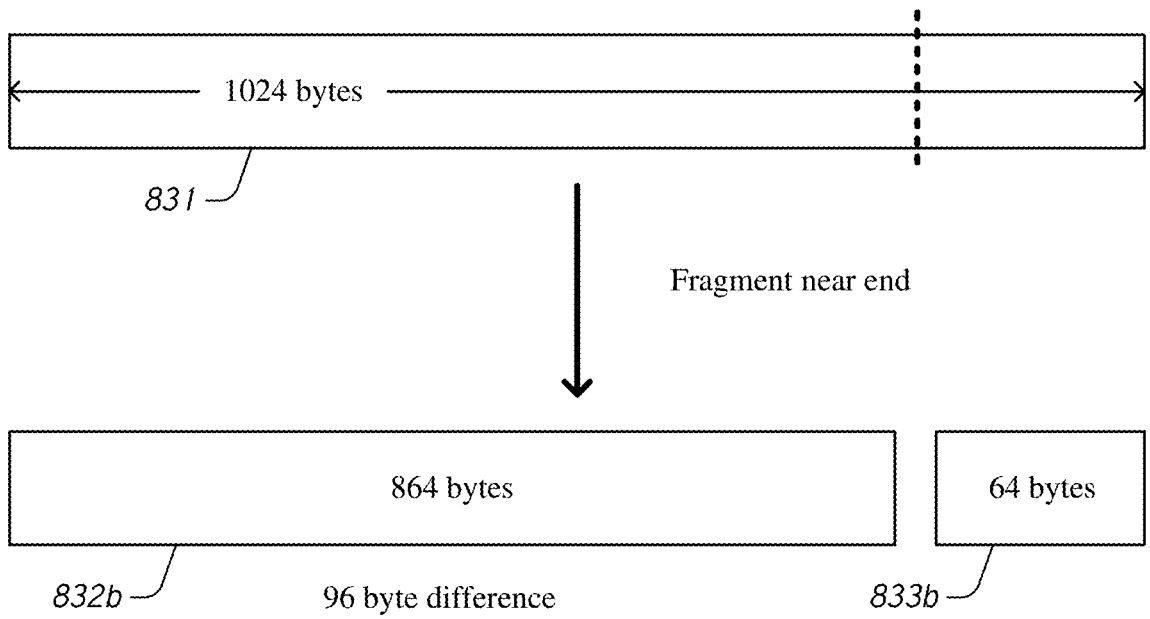

FIG. 8E illustrates an example of fragmentation resulting from a lossy shift, as described with respect to FIG. 8D. A resource block allocation 831 is originally 1024 bytes. In a first case (the upper illustration of FIG. 8E), fragmentation occurs in the middle of the resource block allocation 831. In this case, the resulting fragmented resource blocks 832a, 833a each have 448 bytes. This represents a loss of 128 bytes. In a second case (the lower illustration of FIG. 8D), fragmentation occurs near an end of the resource block allocation 831. This results in a first fragmented resource block 832b with 864 bytes and a second fragmented resource block 833b with 64 bytes. This represents a loss of 96 bytes. One reason for capacity loss resulting from fragmentation is the restrictions on the size of packets. In the example of FIG. 8E, the packets have a minimum size of 32 bytes, and thus fragmentation results in resource blocks that have to a multiple of 32 bytes which leads to capacity loss.

Figure 9:
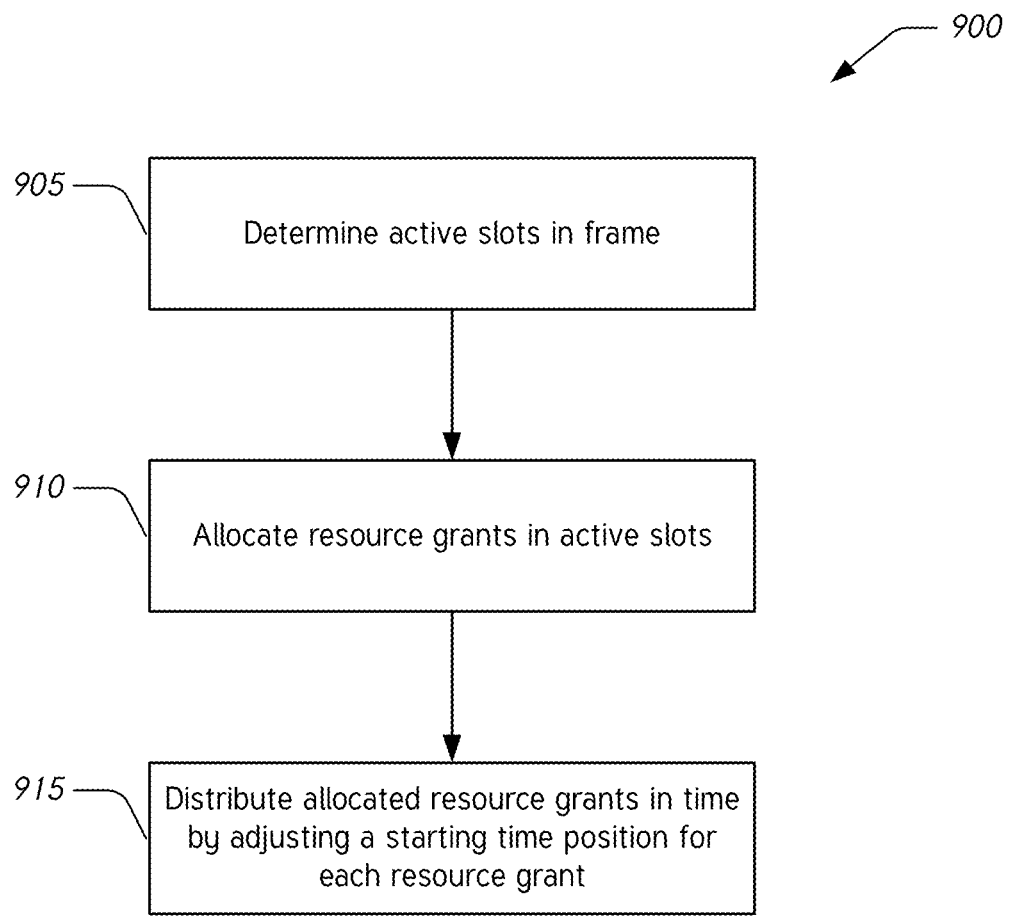
FIG. 9 illustrates a flow chart of an example method for randomizing start times of allocated resource grants in an active slot.

FIG. 9 illustrates a flow chart of an example method 900 for randomizing start times of allocated resource grants in an active slot. The method 900 can be implemented in any of the communications networks described herein with reference to FIGS. 1, 3A-3C, 4A, and 4B. Allocated resource grants represent resource blocks in slots of a frame or epoch, as described herein with reference to FIGS. 2 and 8A-8D. The method 900 is designed to balance complexity and improved network load distribution. In a first stage, a scheduler allocates resource grants based on user terminal demands and QoS requirements, starting from the beginning of a scheduling epoch without trying to make the grants uniformly distributed in time. At the end of stage 1, there is a possibility of front-loading of the resource grants. In stage 2, the scheduler distributes allocated resource grants in time, while maintaining all scheduler constraints, to create a more uniform pattern resulting in improved network load distribution.

The method 900 can be performed in any of the schedulers described herein with reference to FIG. 1, 3A-3C, 4A, or 4B or by a combination of a scheduler and a network resource manager. However, for ease of description, the method 900 will be described as being performed by a scheduler. This is not to be understood to limit the scope of the disclosure. Rather, any step or portion of the method 900 can be performed by any component or combination of components of the communications networks described herein. In addition, blocks 905 and 910 are similar to corresponding blocks described herein with reference to FIGS. 6 and 7, and the description is abbreviated here for the sake of brevity.

At block 905, the scheduler determines a plurality of active slots for a current frame. At block 910, the scheduler proceeds through the plurality of active slots to allocate resource grants within individual active slots to one or more user terminals. At block 915, the scheduler distributes allocated resource grants in time by adjusting a time position within the slot of each resource grant to the one or more user terminals. Resource grants can be grouped into a plurality of return channel groups, individual return channel groups including a set of frequency channels allocated to a collection of user terminals.

In some embodiments, distributing allocated resource grants in time includes inverting a time order of resource grants in a return channel group for randomly selected slots, or a lossless flip. Inverting the time order includes recalculating a start time of each resource grant in the return channel group while maintaining a duration of each resource grant. This does not affect the frequency allocations. The randomly selected slots include the slots in approximately half of the plurality of return channel groups.

In some embodiments, distributing allocated resource grants in time includes shifting a start time of each resource grant within a slot by a random time offset. If a resource grant extends beyond an end of the slot due to the shift in the start time, it is divided or fragmented so that a portion of the resource grant is provided at a beginning of the slot, or a lossy shift. A fragmented resource grant may result in a reduced resource allocation relative to the corresponding resource grant prior to shifting the start time. In certain implementations, a resource grant is truncated if it extends beyond an end of the slot due to the shifted start time so that the resource grant does not extend beyond the end of the slot. In certain embodiments, the random time offset is limited such that none of the resource grants in the slot extend beyond an end of the slot, or a lossless shift.

Example of Combining Interslot and Intraslot Randomization

Figure 10:
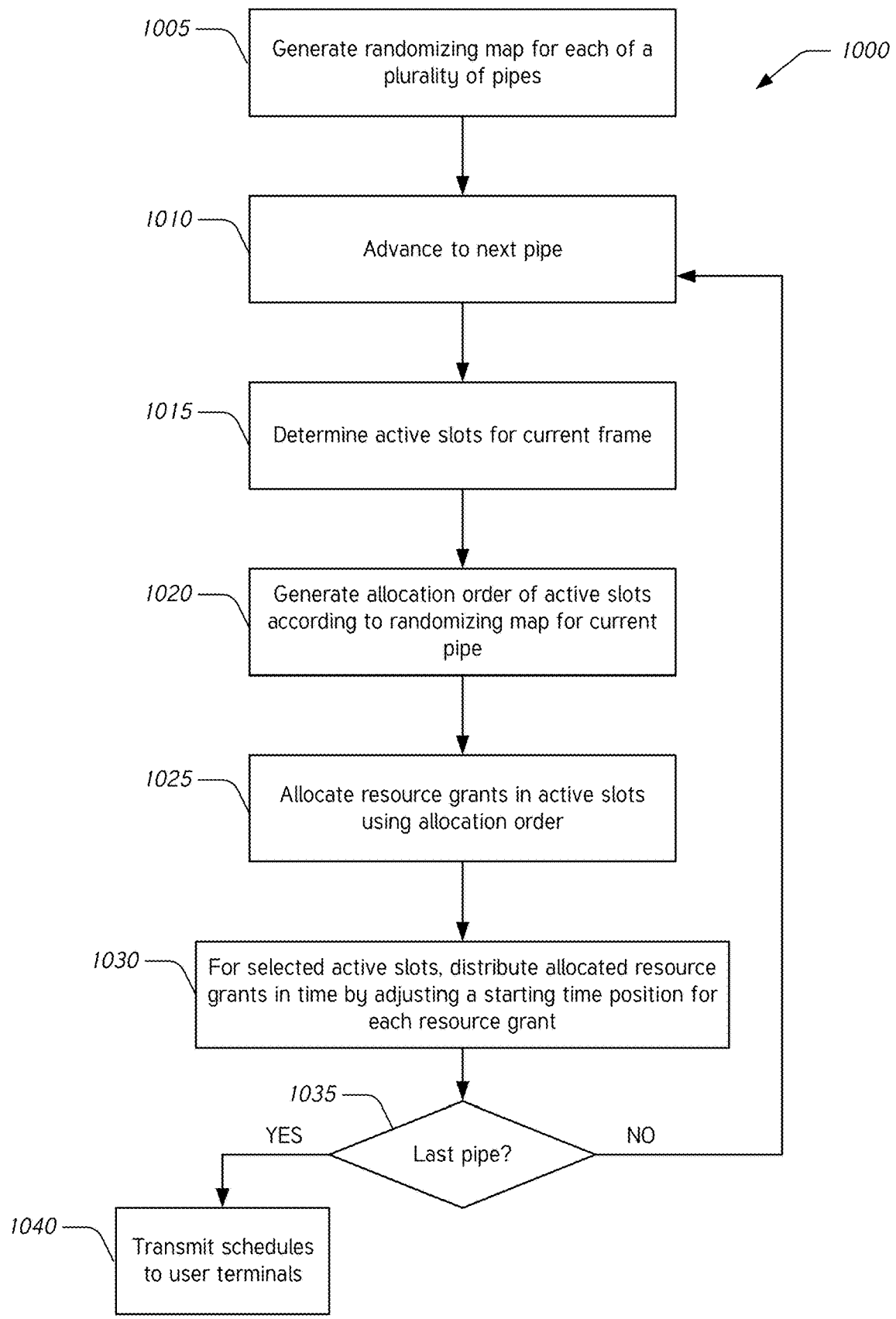
FIG. 10 illustrates a flow chart of an example method for randomizing the order of active slots prior to allocating resource grants using randomizing maps and then randomizing start times of allocated resource grants in an active slot on a communications network with different randomizing maps for different pipes of service flows.

FIG. 10 illustrates a flow chart of an example method 1000 for randomizing the order of active slots prior to allocating resource grants using randomizing maps and then randomizing start times of allocated resource grants in an active slot on a communications network with different randomizing maps for different pipes of service flows. The example method 1000 combines the method 700 with the method 900 to perform both interslot and intraslot randomization to improve network load distribution. Resource grants are allocated using frames each having a plurality of slots that are ordered based on a position in time of a slot in a corresponding frame, as described herein with reference to FIGS. 2, 5A, and 5B. The method 1000 can be performed in any of the network resource managers described herein with reference to FIG. 4A or 4B or by a combination of a scheduler and a network resource manager. However, for ease of description, the method 1000 will be described as being performed by a network resource manager and a scheduler. This is not to be understood to limit the scope of the disclosure. Rather, any step or portion of the method 1000 can be performed by any component or combination of components of the communications networks described herein.

At block 1005, the network resource manager generates a randomizing map for each of a plurality of pipes. Each pipe is a collection of one or more service flows. In a satellite communications network, a beam can service one or more pipes. The randomizing map is configured to randomize an order for allocating resource grants to slots in frames or epochs. The network resource manager can be configured to generate and assign the randomizing maps to individual schedulers to improve network load distribution. In some embodiments, the network resource manager selects the randomizing maps using an algorithm that considers current and predicted network loads, network capacity, quality of service parameters, and the like. The algorithm is configured to generate randomizing maps that advantageously distribute network load to increase quality of service, to decrease network bandwidth bottlenecks, and/or to reduce power consumption. In certain embodiments, the network resource manager randomly generates and assigns the randomizing maps. This can be done with the expectation that statistical variations will result in a relatively even distribution of network load.

At block 1010, the network resource manager advances through each pipe of the plurality of pipes and performs each of the steps 1015, 1020, 1025, and 1030 for the current pipe. In some embodiments, a scheduler corresponding to the current pipe or beam performs the steps 1015, 1020, 1025, and 1030. Because these steps are similar to the corresponding steps in the method 600 in addition to the corresponding step in the method 900, only a brief description of the steps is provided here.

At block 1015, the scheduler determines a plurality of active slots for a current frame of the beam. At block 1020, the scheduler generates an allocation order for the plurality of active slots according to the randomizing map of the pipe or beam. At block 1025, the scheduler proceeds through the plurality of active slots in the allocation order to allocate resource grants within individual active slots. At block 1030, the scheduler distributes allocated resource grants in time by adjusting a starting time position for each resource grant. This can include a lossless flip, lossless shift, or a lossy shift.

At block 1035, the network resource manager determines whether all of the pipes have been randomized. If so, the network resource manager moves to block 1040 to transmit the resulting schedules to the user terminals. If not, the network resource manager returns to block 1010 and advances to the next pipe due for resource block allocation.

In some embodiments, allocation of resource grants is constrained such that a single user terminal is not scheduled to transmit on multiple frequency channels simultaneously. In certain embodiments, a user terminal may include a plurality of transmitters capable of simultaneously transmitting on different frequency channels and this constraint is ignored or not enforced when allocating resource grants. In some embodiments, allocation of resource grants is constrained such that multiple user terminals within a pipe or beam are not scheduled to simultaneously transmit on identical frequency channels. In some embodiments, individual slots in a frame or epoch include one or more resource block allocations to one or more user terminals. In such embodiments, individual resource block allocations can include an allocation of time and frequency within an individual slot. In certain implementations, allocating resource grants comprises allocating return-link bandwidth.

The method 1000 combines intraslot and interslot randomization to achieve improved network load distribution relative to performing intraslot or interslot randomization alone. In addition, by generating a randomized allocation order prior to allocating resource grants and by randomly distributing resource grants after allocation, typical and beneficial methods for allocating resource grants can be used in conjunction with the disclosed randomization techniques. Thus, the randomization techniques can be implemented without invalidating resource grants.

Additional Embodiments

Figure 11:
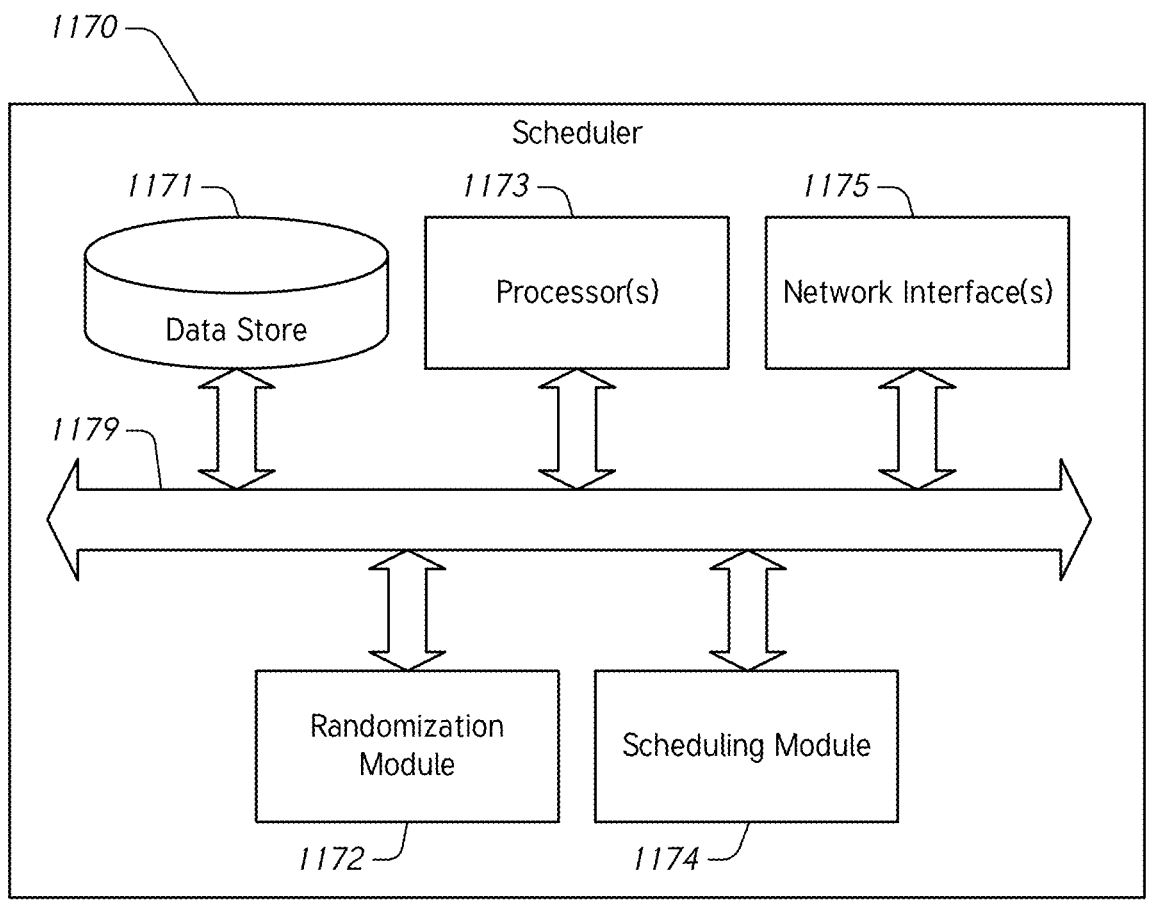
FIG. 11 illustrates a block diagram of an example scheduler configured to randomize the order of active slots for allocating resource grants and/or to redistribute allocated resource grants in active slots to improve a transmission power profile and/or to distribute network load.

FIG. 11 illustrates a block diagram of an example scheduler 1170 configured to randomize the order of active slots for allocating resource grants and/or to redistribute allocated resource grants in active slots to distribute network load. The scheduler 1170 is configured to randomize resource grant allocations using intraslot and interslot randomization techniques. The scheduler 1170 is similar to the schedulers described herein with reference to FIGS. 1, 3A-3C, 4A, and 4B and can be implemented in the network communications systems there described. The scheduler 1170 can employ any method described herein for randomizing resource grants, such as the example methods 600, 700, 900, and 1000 described herein with reference to FIGS. 6, 7, 9 and 10, respectively.

The scheduler 1170 can include hardware, software, and/or firmware components for managing resource grant allocations. The scheduler 1170 includes a data store 1171, one or more processors 1173, one or more network interfaces 1175, a randomization module 1172, and a scheduling module 1174. Components of scheduler 1170 can communicate with one another, with external systems, and with other components of a network using communication bus 1179. The scheduler 1170 can be implemented using one or more computing devices. For example, the scheduler 1170 can be implemented using a single computing device, multiple computing devices, a distributed computing environment, or it can be located in a virtual device residing in a public or private computing cloud. In a distributed computing environment, one or more computing devices can be configured to provide the modules 1172, 1174 to provide the described functionality.

The scheduler 1170 includes the randomization module 1172 to perform intraslot and interslot randomization, as described herein. The scheduler 1170 includes the scheduling module 1174 to allocate resource grants to user terminals, as described herein.

The scheduler 1170 includes one or more processors 1173 that are configured to control operation of the modules 1172, 1174 and the data store 1171. The one or more processors 1173 implement and utilize the software modules, hardware components, and/or firmware elements configured to schedule and randomize resource grant allocations. The one or more processors 1173 can include any suitable computer processors, application-specific integrated circuits (ASICs), field programmable gate array (FPGAs), or other suitable microprocessors. The one or more processors 1173 can include other computing components configured to interface with the various modules and data stores of the scheduler 1170.

The scheduler 1170 includes the data store 1171 configured to store configuration data, user requirements, network statuses, network characteristics and capabilities, control commands, databases, algorithms, executable instructions (e.g., instructions for the one or more processors 1173), and the like. The data store 1171 can be any suitable data storage device or combination of devices that include, for example and without limitation, random access memory, read-only memory, solid-state disks, hard drives, flash drives, bubble memory, and the like.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill and are intended to form a part of this disclosure. Various methods are described herein in connection with various flowchart steps and/or phases. It will be understood that in many cases, certain steps and/or phases may be combined such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some aspects of the systems and methods described herein can advantageously be implemented using, for example, computer software, hardware, firmware, or any combination of computer software, hardware, and firmware. Computer software can comprise computer executable code stored in a computer readable medium (e.g., non-transitory computer readable medium) that, when executed, performs the functions described herein. In some embodiments, computer-executable code is executed by one or more general purpose computer processors. A skilled artisan will appreciate, in light of this disclosure, that any feature or function that can be implemented using software to be executed on a general-purpose computer can also be implemented using a different combination of hardware, software, or firmware. For example, such a module can be implemented completely in hardware using a combination of integrated circuits. Alternatively or additionally, such a feature or function can be implemented completely or partially using specialized computers designed to perform the particular functions described herein rather than by general purpose computers.

Multiple distributed computing devices can be substituted for any single computing device described herein. In such distributed embodiments, the functions of the one computing device are distributed (e.g., over a network) such that some functions are performed on each of the distributed computing devices.

Some embodiments may be described with reference to equations, algorithms, and/or flowchart illustrations. These methods may be implemented using computer program instructions executable on one or more computers. These methods may also be implemented as computer program products either separately, or as a component of an apparatus or system. In this regard, each equation, algorithm, block, or step of a flowchart, and combinations thereof, may be implemented by hardware, firmware, and/or software including one or more computer program instructions embodied in computer-readable program code logic. As will be appreciated, any such computer program instructions may be loaded onto one or more computers, including without limitation a general-purpose computer or special purpose computer, or other programmable processing apparatus to produce a machine, such that the computer program instructions which execute on the computer(s) or other programmable processing device(s) implement the functions specified in the equations, algorithms, and/or flowcharts. It will also be understood that each equation, algorithm, and/or block in flowchart illustrations, and combinations thereof, may be implemented by special purpose hardware-based computer systems which perform the specified functions or steps, or combinations of special purpose hardware and computer-readable program code logic means.

Furthermore, computer program instructions, such as embodied in computer-readable program code logic, may also be stored in a computer readable memory (e.g., a non-transitory computer readable medium) that can direct one or more computers or other programmable processing devices to function in a particular manner, such that the instructions stored in the computer-readable memory implement the function(s) specified in the block(s) of the flowchart(s). The computer program instructions may also be loaded onto one or more computers or other programmable computing devices to cause a series of operational steps to be performed on the one or more computers or other programmable computing devices to produce a computer-implemented process such that the instructions which execute on the computer or other programmable processing apparatus provide steps for implementing the functions specified in the equation(s), algorithm(s), and/or block(s) of the flowchart(s).

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips and/or magnetic disks, into a different state.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list. The word "exemplary" is used exclusively herein to mean "serving as an example, instance, or illustration." Any implementation described herein as "exemplary" is not necessarily to be construed as preferred or advantageous over other implementations.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems and are not limited to the methods and systems described above, and elements and acts of the various embodiments described above can be combined to provide further embodiments. Accordingly, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method for allocating resource grants on a communications network, resource grants allocated using frames having a plurality of available slots, the method comprising:
   determining a plurality of active slots for a current frame, the plurality of active slots comprising a subset of the plurality of available slots in the current frame to be used to allocate resource grants;
   proceeding through the plurality of active slots to allocate resource grants within individual active slots to one or more user terminals; and
   distributing allocated resource grants in time by adjusting a time position within the active slot of each resource grant to the one or more user terminals,
   wherein resource grants are grouped into a plurality of return channel groups, individual return channel groups comprising a set of frequency channels allocated to a collection of user terminals.

2. The method of claim 1, wherein individual available slots comprise bandwidth allocations to one or more user terminals, individual bandwidth allocations including an allocation of time and frequency within the corresponding available slot.

3. The method of claim 2, wherein allocating resource grants is constrained such that a single user terminal is not scheduled to transmit on multiple frequency channels simultaneously.

4. The method of claim 2, wherein allocating resource grants is constrained such that multiple user terminals are not scheduled to simultaneously transmit on identical frequency channels.

5. The method of claim 1, wherein distributing allocated resource grants in time comprises inverting a time order of resource grants in a return channel group for randomly selected active slots.

6. The method of claim 5, wherein inverting the time order comprises recalculating a start time of each resource grant in the return channel group while maintaining a duration of each resource grant.

7. The method of claim 5, wherein the randomly selected active slots comprise the active slots in approximately half of the plurality of return channel groups.

8. The method of claim 1, wherein distributing allocated resource grants in time comprises shifting a start time of each resource grant within an active slot by a random time offset.

9. The method of claim 8, wherein a resource grant that extends beyond an end of the active slot due to the shift in the start time is divided so that a portion of the resource grant is provided at a beginning of the active slot.

10. The method of claim 9, wherein a resource grant that is divided results in a reduced resource allocation relative to the corresponding resource grant prior to shifting the start time.

11. The method of claim 8 further comprising truncating a duration of a resource grant that extends beyond an end of the active slot due to the shifted start time so that the resource grant does not extend beyond the end of the active slot.

12. The method of claim 8, wherein the random time offset is limited such that none of the resource grants in the active slot extend beyond an end of the active slot.

13. A scheduler in a communications network, the scheduler comprising:
   a network interface configured to communicate with a plurality of user terminals over the communications network;
   a data store configured to store computer executable instructions for allocating resource grants, resource grants allocated using frames having a plurality of available slots that are ordered based on a position in time of an available slot in a corresponding frame;
   a processor configured to execute the computer executable instructions to perform the following:
      determining a plurality of active slots for a current frame, the plurality of active slots comprising a subset of the plurality of available slots in the current frame to be used to allocate resource grants;
      proceeding through the plurality of active slots to allocate resource grants within individual active slots to one or more user terminals; and
      distributing allocated resource grants in time by adjusting a time position within the active slot of each resource grant to the one or more user terminals,
   wherein resource grants are grouped into a plurality of return channel groups, individual return channel groups comprising a set of frequency channels allocated to a collection of user terminals.

14. The scheduler of claim 13, wherein individual available slots comprise bandwidth allocations to one or more user terminals, individual bandwidth allocations including an allocation of time and frequency within the corresponding available slot.

15. The scheduler of claim 14, wherein allocating resource grants is constrained such that a single user terminal is not scheduled to transmit on multiple frequency channels simultaneously.

16. The scheduler of claim 14, wherein allocating resource grants is constrained such that multiple user terminals are not scheduled to simultaneously transmit on identical frequency channels.

17. The scheduler of claim 14, wherein distributing allocated resource grants in time comprises inverting a time order of resource grants in a return channel group for randomly selected active slots.

18. The scheduler of claim 17, wherein inverting the time order comprises recalculating a start time of each resource grant in the return channel group while maintaining a duration of each resource grant.

19. The scheduler of claim 17, wherein the randomly selected active slots comprise the active slots in approximately half of the plurality of return channel groups.

20. A scheduler in a communications network, the scheduler comprising:
   a network interface configured to communicate with a plurality of user terminals over the communications network;

a data store configured to store computer executable instructions for allocating resource grants, resource grants allocated using frames having a plurality of available slots that are ordered based on a position in time of an available slot in a corresponding frame;

a processor configured to execute the computer executable instructions to perform the following:
- determining a plurality of active slots for a current frame, the plurality of active slots comprising a subset of the plurality of available slots in the current frame to be used to allocate resource grants;
- proceeding through the plurality of active slots to allocate resource grants within individual active slots to one or more user terminals; and
- distributing allocated resource grants in time by adjusting a time position within the active slot of each resource grant to the one or more user terminals, wherein distributing allocated resource grants in time comprises shifting a start time of each resource grant within an active slot by a random time offset.

21. The scheduler of claim 20, wherein a resource grant that extends beyond an end of the active slot due to the shift in the start time is divided so that a portion of the resource grant is provided at a beginning of the active slot.

22. The scheduler of claim 21, wherein a resource grant that is divided results in a reduced resource allocation relative to the corresponding resource grant prior to shifting the start time.

23. The scheduler of claim 20, wherein the processor is further configured to truncate a duration of a resource grant that extends beyond an end of the active slot due to the shifted start time so that the resource grant does not extend beyond the end of the active slot.

24. The scheduler of claim 20, wherein the random time offset is limited such that none of the resource grants in the active slot extend beyond an end of the active slot.

25. The scheduler of claim 20, wherein individual available slots comprise bandwidth allocations to one or more user terminals, individual bandwidth allocations including an allocation of time and frequency within the corresponding available slot.

26. The scheduler of claim 25, wherein allocating resource grants is constrained such that a single user terminal is not scheduled to transmit on multiple frequency channels simultaneously.

* * * * *